(12) United States Patent
Mitsutani

(10) Patent No.: US 11,899,484 B2
(45) Date of Patent: *Feb. 13, 2024

(54) SUPPLY-DEMAND CONTROL DEVICE

(71) Applicant: TOYOTA JIDOSHA KABUSHIKI KAISHA, Toyota (JP)

(72) Inventor: Noritake Mitsutani, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/993,368

(22) Filed: Nov. 23, 2022

(65) Prior Publication Data

US 2023/0083862 A1 Mar. 16, 2023

Related U.S. Application Data

(63) Continuation of application No. 16/806,358, filed on Mar. 2, 2020, now Pat. No. 11,537,156.

(30) Foreign Application Priority Data

Mar. 20, 2021 (JP) .................... 2019-053616

(51) Int. Cl.
*G05F 1/66* (2006.01)
*H02J 7/00* (2006.01)

(52) U.S. Cl.
CPC .............. *G05F 1/66* (2013.01); *H02J 7/0063* (2013.01); *H02J 7/00306* (2020.01)

(58) Field of Classification Search
CPC ....... G05F 1/66; H02J 7/00306; H02J 7/0063; H02J 3/14; H02J 2310/60; H02J 2310/48;
(Continued)

(56) References Cited

U.S. PATENT DOCUMENTS 4,694,192 A 9/1987 Payne
6,026,198 A 2/2000 Okada
(Continued)

FOREIGN PATENT DOCUMENTS

EP 2144346 A1 1/2010
EP 2937243 A1 10/2015
(Continued)

*Primary Examiner* — Yuhui R Pan
(74) *Attorney, Agent, or Firm* — Oblon, McClelland, Maier & Neustadt, L.L.P.

(57) ABSTRACT

A supply-demand control device is configured to: set, for each priority rank defined in advance, an allowable limit within a range of a value set for a higher priority rank than the each priority rank, the allowable limit indicating an upper limit of the power or the energy allowed to be supplied in response to a demand of the each priority rank while the power or the energy supplied in response to a demand of the higher priority rank is secured; detect the demand for the power or the energy, which occurs in the industrial product; and allocate, in order of the priority rank, the power or the energy supplied from a predetermined supply source in response to the detected demand, such that the supplied power or energy is equal to or lower than the upper limit indicated by the allowable limit set for the each priority rank.

12 Claims, 17 Drawing Sheets

(58) Field of Classification Search
CPC ......... H02J 3/46; H02J 3/144; Y02B 70/3225; B60R 16/03; Y04S 20/222
See application file for complete search history.

(56) References Cited

U.S. PATENT DOCUMENTS

| | | |
|---|---|---|
| 7,444,526 B2 | 10/2008 | Felter |
| 2004/0124703 A1* | 7/2004 | Tani .................. B60R 16/0315 307/10.1 |
| 2009/0309419 A1 | 12/2009 | Yamasaki et al. |
| 2010/0023239 A1 | 1/2010 | Self |
| 2012/0229077 A1 | 9/2012 | Tsuchiya |
| 2012/0271474 A1 | 10/2012 | Yoneda |
| 2014/0288725 A1 | 9/2014 | Itaya |
| 2014/0316599 A1 | 10/2014 | Tomita |
| 2014/0324237 A1 | 10/2014 | Oe |
| 2015/0212533 A1 | 7/2015 | Gotoh |
| 2015/0261239 A1 | 9/2015 | Zhang |
| 2016/0134145 A1 | 5/2016 | Sakuma |
| 2016/0197474 A1 | 7/2016 | Aisu |
| 2016/0239079 A1 | 8/2016 | Yuasa |
| 2016/0282930 A1 | 9/2016 | Ramachandran |
| 2016/0316621 A1 | 11/2016 | Fritz |
| 2018/0090943 A1 | 3/2018 | Wu |

FOREIGN PATENT DOCUMENTS

| | | |
|---|---|---|
| JP | 2004-194495 A | 7/2004 |
| JP | 2007-126050 A | 5/2007 |
| JP | 2009-301281 A | 12/2009 |
| JP | 2012-195988 A | 10/2012 |
| JP | 2013162571 A | 8/2013 |
| JP | 2016082838 A | 5/2016 |
| JP | 2016-226141 A | 12/2016 |

* cited by examiner

FIG. 2

| PRIORITY RANK | | CATEGORY | DEMAND REQUIREMENT | SUPPLY REQUIREMENT, STORAGE REQUIREMENT |
|---|---|---|---|---|
| P1 | | SAFETY | | |
| P2 | | SECURITY | | |
| P3 | | COMPLIANCE | | |
| | 1 | REGULATIONS (EMISSION) | | |
| | 2 | SPECIFICATIONS (FUEL EFFICIENCY) | | |
| P4 | | BASIC PERFORMANCE | | |
| | | SYSTEM STARTUP NORMAL TRAVELING | | |
| P5 | | PARTS PROTECTION | | |
| | 1 | FAILURE AVOIDANCE (FUNCTION PROTECTION) | | |
| | 2 | DETERIORATION AVOIDANCE (LIFE MAINTENANCE) | | |
| P6 | | MARKETABILITY | | |
| | | POWER QUIETNESS DRIVING STABILITY NOMINAL FUEL EFFICIENCY ADVANCED DEVICES | | |
| P7 | | ECONOMICS | | |
| | 1 | FUEL CONSUMPTION | | |
| | 2 | EV DISTANCE | | |
| | 3 | ELECTRICITY CHARGES | | |
| | 4 | AUXILIARY DEVICE LIFE EXTENSION | | |
| P8 | | ADDED VALUE | | |

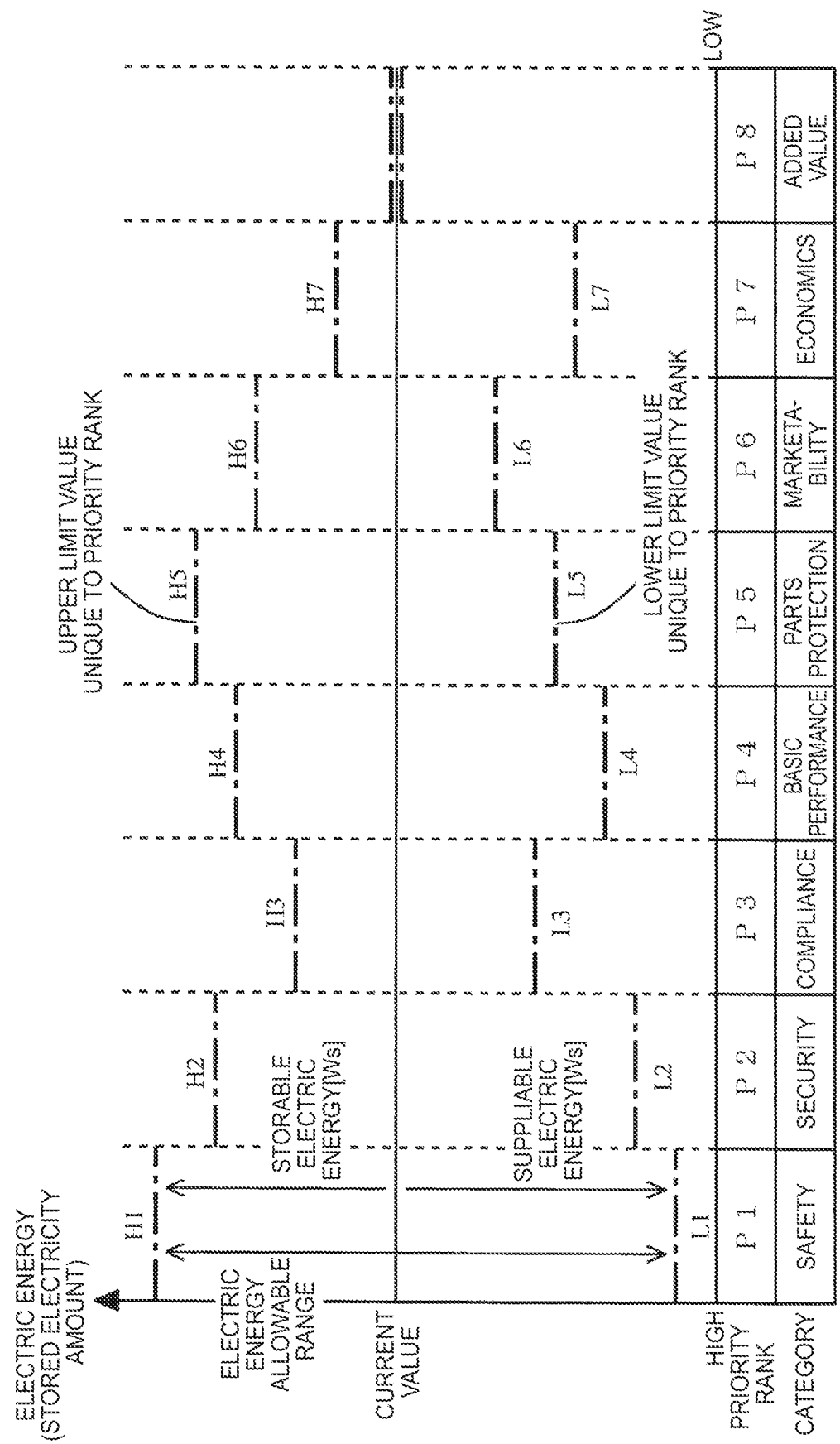

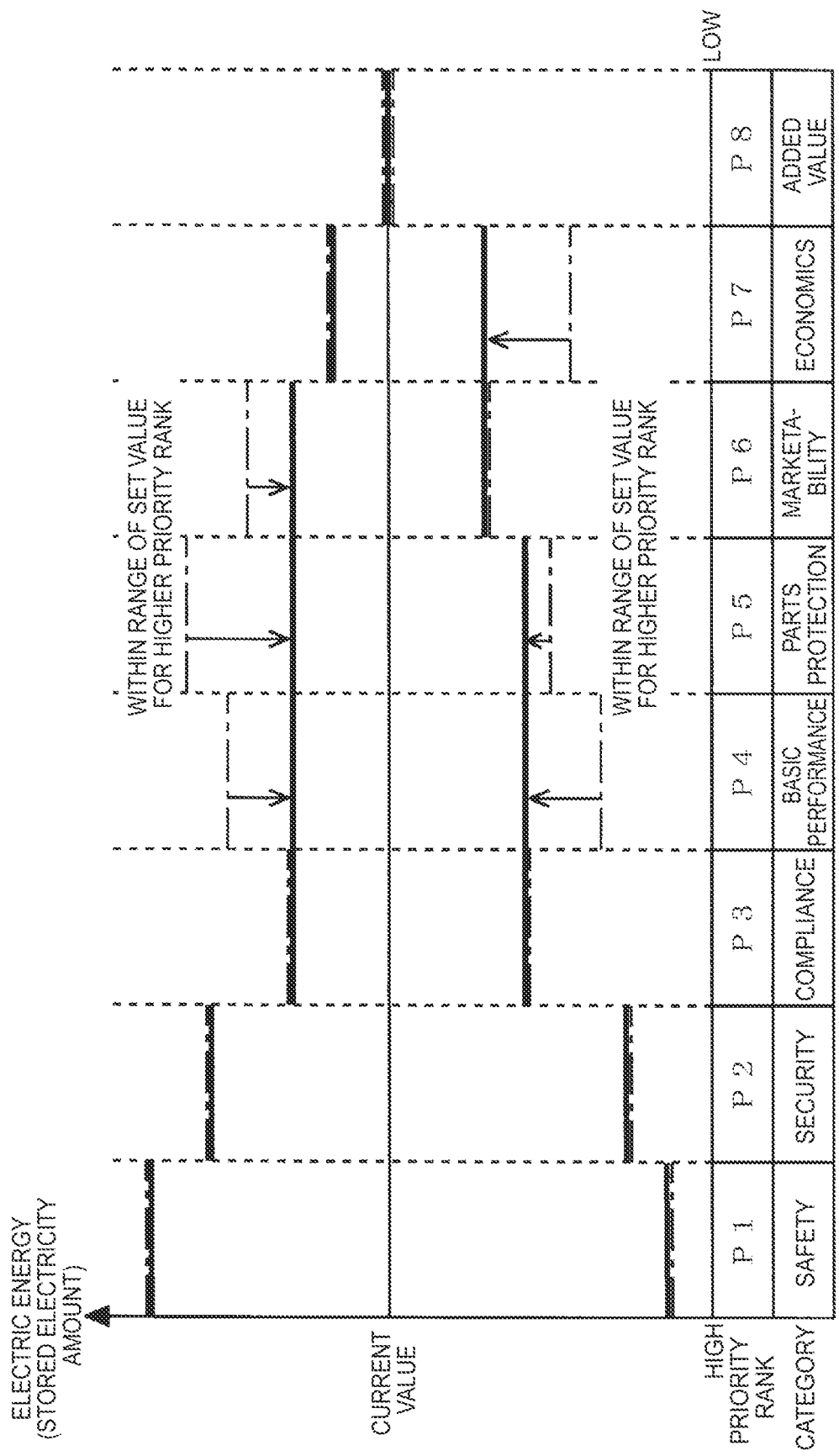

FIG. 7

| PRIORITY RANK | | CATEGORY | DEMAND REQUIREMENT (EXAMPLE) | SUPPLY REQUIREMENT, STORAGE REQUIREMENT (EXAMPLE) |
|---|---|---|---|---|
| P1 | | SAFETY | | OVERCHARGE LIMIT |
| P2 | | SECURITY | | OVER-DISCHARGE LIMIT (DDC OUTPUT LIMIT) |
| P3 | | COMPLIANCE | | |
| | 1 | REGULATIONS (EMISSION) | | EMISSION |
| | 2 | SPECIFICATIONS (FUEL EFFICIENCY) | | LOW SOC |
| P4 | | BASIC PERFORMANCE | PROVISION → AVOID STARTUP FAILURE | SHORT TIME Wout CRANKING LOWER LIMIT SOC + α |
| | | SYSTEM STARTUP NORMAL TRAVELING | | |
| P5 | | PARTS PROTECTION | PROVISION (LONG TIME) → AVOID EXHAUSTION OF AUXILIARY BATTERY | LONG TIME Wout DDC OVERHEAT PROTECTION |
| | 1 | FAILURE AVOIDANCE (FUNCTION PROTECTION) | | |
| | 2 | DETERIORATION AVOIDANCE (LIFE MAINTENANCE) | PROVISION (SHORT TIME) → SECURE DURABILITY OF AUXILIARY BATTERY | |
| P6 | | MARKETABILITY | PROVISION → GUARANTEE OPERATION OF ADVANCED DEVICES | Δ SOC UPPER/LOWER LIMIT DURING PARKING → IMPACT USER AFTER RIDING ON VEHICLE |
| | | POWER QUIETNESS DRIVING STABILITY NOMINAL FUEL EFFICIENCY ADVANCED DEVICES | | |
| P7 | | ECONOMICS | | HIGH VOLTAGE AUXILIARY CHARGE |
| | 1 | FUEL CONSUMPTION | | |
| | 2 | EV DISTANCE | | PROVISION DURING PARKING |
| | 3 | ELECTRICITY CHARGES | | CHARGER STARTUP |
| | 4 | AUXILIARY DEVICE LIFE EXTENSION | PROVISION FOR MULTIPLE DEMANDS | |
| P8 | | ADDED VALUE | | |

FIG. 10

| OCCURRENCE FREQUENCY RANK | | DEFINITION | FUEL EFFICIENCY DETERIORATION ALLOWANCE |
|---|---|---|---|
| F1 | REGULAR | OCCUR EVERY TIME VEHICLE TRAVELS | DETERIORATION ALMOST ZERO |
| F2 | HIGH FREQUENCY | OCCUR WITH HIGH FREQUENCY WITH RESPECT TO MOST USERS | DETERIORATION BY VERY SMALL AMOUNT |
| F3 | MEDIUM FREQUENCY | OCCUR WITH A MEDIUM FREQUENCY WITH RESPECT TO CERTAIN NUMBER OF USERS | DETERIORATION BY SMALL AMOUNT |
| F4 | LOW FREQUENCY | OCCUR WITH A LOW FREQUENCY WITH RESPECT TO LIMITED NUMBER OF USERS | DETERIORATION BY MEDIUM AMOUNT |
| F5 | VERY RARE | OCCUR UNDER SPECIAL CONDITION | NO LIMITATION ON DETERIORATION |

FIG. 11

| PRIORITY RANK | | CATEGORY | DEMAND REQUIREMENT | SUPPLY REQUIREMENT, STORAGE REQUIREMENT (EXAMPLE) |
|---|---|---|---|---|
| P1 | | SAFETY | | |
| P2 | | SECURITY | | |
| P3 | | COMPLIANCE | | |
| | 1 | REGULATIONS (EMISSION) | | |
| | 2 | SPECIFICATIONS (FUEL EFFICIENCY) | | F1 DEMAND: Δ SOC VERY SMALL<br>F2 DEMAND: Δ SOC SMALL<br>F3 DEMAND: Δ SOC INTERMEDIATE<br>F4 DEMAND: Δ SOC LARGE<br>F5 DEMAND: Δ SOC LOWER LIMIT |
| P4 | | BASIC PERFORMANCE | | |
| | | SYSTEM STARTUP NORMAL TRAVELING | | |
| P5 | | PARTS PROTECTION | | |
| | 3 | ELECTRICITY CHARGES | | |
| | 4 | AUXILIARY DEVICE LIFE EXTENSION | | |
| P8 | | ADDED VALUE | | |

SUPPLY-DEMAND CONTROL DEVICE

INCORPORATION BY REFERENCE

This application is a continuation of U.S. application Ser. No. 16/806,358, filed Mar. 2, 2020, the entire contents of which is incorporated herein by reference. U.S. application Ser. No. 16/806,358 claims the benefit of priority under 35 U.S.C. § 119 of Japanese Application No. 2019-053616, filed Mar. 20, 2019 including the specification, drawings and abstract is incorporated herein by reference in its entirety.

BACKGROUND

1. Technical Field

The disclosure relates to a supply-demand control device that is mounted on an industrial product and controls supply and demand of power (electric power) or energy (electric energy) in the industrial product.

2. Description of Related Art

Japanese Unexamined Patent Application Publication No. 2012-195988 (JP 2012-195988 A) describes a power supply-demand control device that controls electric power demands (power consumption) from a plurality of load devices and electric power supplies from a plurality of power supply devices regarding electric power that is one of power. In the power supply-demand control device, a total demand electric power required by the load devices is compared with a total supply electric power supplied by the power supply devices. When the total demand electric power is larger than the total supply electric power, the power supply-demand control device instructs a power supply device having surplus electric power to increase supply electric power. If there is no power supply device having surplus electric power, the power supply-demand control device instructs the load devices to reduce demand electric power (electric power consumption). This makes it possible to quickly respond to changes in a supply-demand balance.

SUMMARY

The power supply-demand control device described in JP 2012-195988 A dynamically determines, when no power supply device has surplus electric power, a load device that the power supply-demand control device instructs to reduce the demand electric power, based on operational stability of the load devices. Thus, when an electric power demand from a general load device and an electric power demand from an important load device that should be given priority of electric power supply over the general load device exceed an upper limit of the total supply electric power of the power supply devices, for example, only the important load device may be instructed to reduce the electric power demand depending on the operational stability of the load device. In this case, the supply-demand balance of the power supply-demand control device is ensured, but appropriate electric power supply based on the priorities of the electric power demands is not performed. Thus, there is room for further improvement in controlling supply and demand of power or energy.

The disclosure provides a supply-demand control device that can appropriately control supply and demand of power or energy based on priorities.

An aspect of the disclosure relates to a supply-demand control device that is mounted on an industrial product and that controls supply and demand of power or energy in the industrial product. The supply-demand control device includes a controller. The controller is configured to: set, for each of a plurality of priority ranks defined in advance to classify various possible demands from the industrial product for the power or the energy, an allowable limit within a range of a value set for a higher priority rank than the each of the priority ranks, the allowable limit indicating an upper limit of the power or the energy that is allowed to be supplied in response to a demand of the each of the priority ranks while the power or the energy that is supplied in response to a demand of the higher priority rank is secured; detect the demand for the power or the energy, which occurs in the industrial product; and allocate, in order of the priority rank, the power or the energy that is supplied from a predetermined supply source in response to the detected demand for the power or the energy, such that the supplied power or the supplied energy is equal to or lower than the upper limit indicated by the allowable limit set for the each of the priority ranks.

In the supply-demand control device according to the above aspect, the controller may be configured to allocate, each time the demand for the power or the energy is detected and within a range of possibility, the power or the energy required by the demand for the power or the energy and equal to or lower than the upper limit indicated by the allowable limit for the each of the priority ranks, in order from the demand for the power or the energy of the higher priority rank. The controller may be configured to allocate the power or the energy that is supplied from the supply source in response to the demand for the power or the energy.

In the supply-demand control device according to the above aspect, the controller may further define a plurality of occurrence frequency ranks each indicating a frequency of occurrence of the demand for the power or the energy. The controller may be configured to change the allowable limit for the each of the priority ranks in accordance with the occurrence frequency ranks.

In the supply-demand control device according to the above aspect, the controller may be configured to set the allowable limit larger for an occurrence frequency rank, out of the occurrence frequency ranks, with a lower frequency of occurrence of the demand for the power or the energy.

In the supply-demand control device according to the above aspect, the power may be electric power and the energy may be electric energy.

With the supply-demand control device according to the above aspect, a maximum power or energy that can be supplied in response to the demand of a relatively low priority rank is limited to be equal to or less than the maximum power or energy that can be supplied in response to the demand of a relatively high priority rank. Thus, the supply and demand of power or energy can be appropriately controlled based on the priority,

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 shows an example in which priority ranks are defined;

FIG. 3A shows an example of lower and upper limit values for each priority rank regarding energy (electric energy);

FIG. 4 shows an example in which a control lower limit value and a control upper limit value for each priority rank are determined based on FIG. 3A;

FIG. 7 shows a specific example of requirements for the priority ranks in an energy (electric energy) providing process;

FIG. 10 shows an example in which occurrence frequency ranks are defined;

FIG. 11 shows a specific example of supply requirements based on the occurrence frequency ranks in the energy (electric energy) providing process;

DETAILED DESCRIPTION OF EMBODIMENTS

A supply-demand control device according to the disclosure gives priority ranks indicating priorities of supplying power or energy from a predetermined supply/storage source in response to various power or energy demands that can occur in industrial products. For the priority ranks, allowable limits each indicating an upper limit of supply of power or energy to be allowed are set in descending order from the highest priority rank to the lowest priority rank. By allocating power or energy to be supplied in response to the respective demands of the priority ranks in order of the priority rank based on the allowable limits, it is possible to appropriately control supply and demand of power or energy based on the priorities.

Embodiment

The supply-demand control device according to the disclosure can be applied to controlling supply and demand of power or energy regarding various physical quantities. Hereinafter, an embodiment using electric power (W) and electric energy (Ws) that are power and energy, respectively, in the electric field is taken as an example, and a supply-demand control device that controls supply and demand of power or energy will be described in detail with reference to the drawings. In the following description, in principle, electric power and electric energy are distinguished from each other. However, the wording "electric power etc." will be used in order to express content that can indicate both electric power and electric energy.

Configuration

Figure 1:
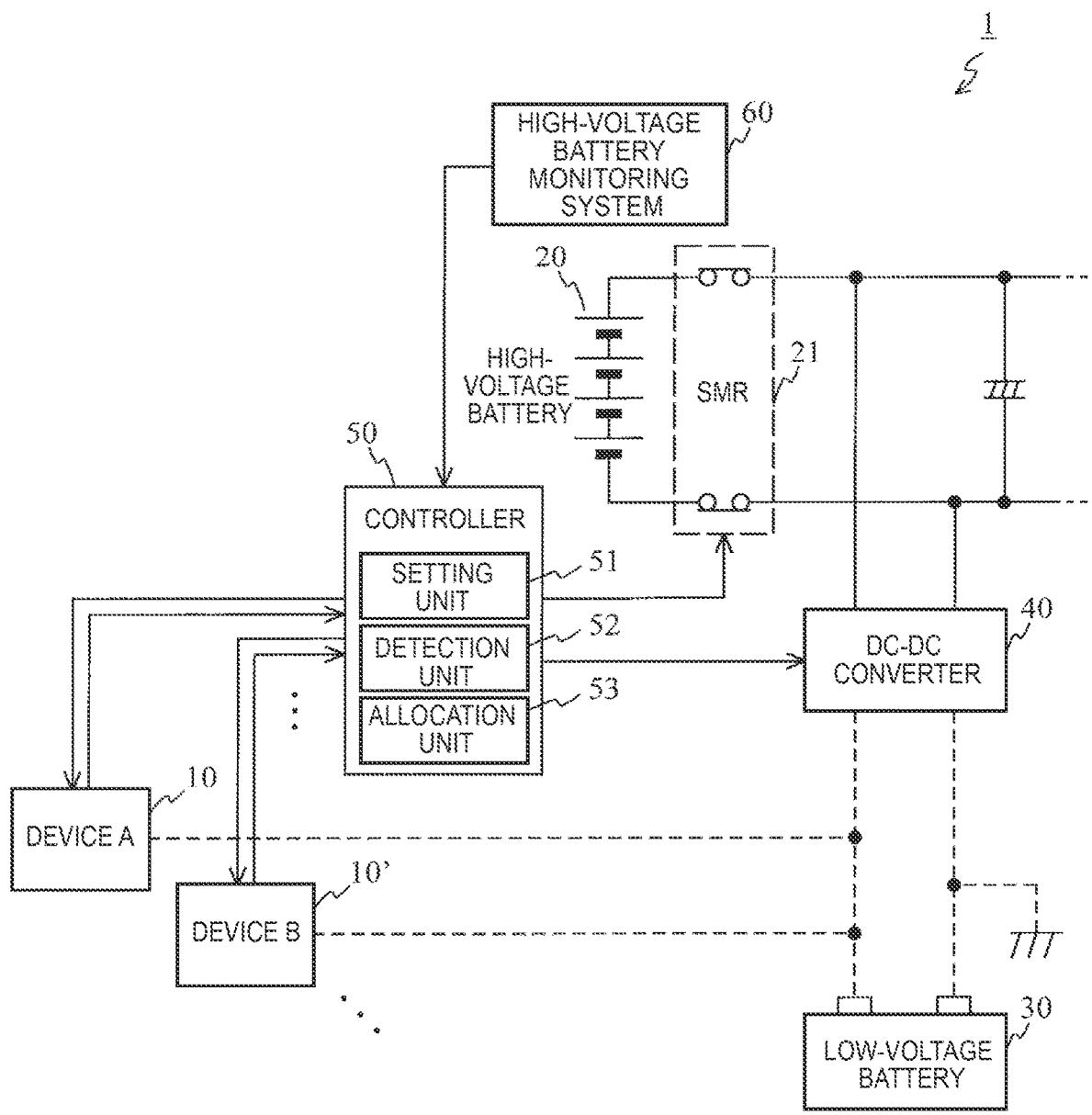
FIG. 1 is a schematic configuration diagram of a system in which a supply-demand control device according to an embodiment of the disclosure is mounted on an industrial product (vehicle)

FIG. 1 is a block diagram showing a schematic configuration of a vehicle system in which a supply-demand control device according to an embodiment of the disclosure is mounted on a vehicle. A vehicle system 1 illustrated in FIG. 1 includes a plurality of devices 10, a high-voltage battery 20, a low-voltage battery 30, a direct current-to-direct current (DC-DC) converter 40, a controller 50 that is the supply-demand control device, and a high-voltage battery monitoring system 60.

The devices 10 are devices mounted on the vehicle. Each of the devices 10 generates a demand for using electric power necessary for performing a predetermined operation (electric power demand) or a demand for consuming required electric energy (electric energy demand). The electric power demand may include a demand for discharging the electric power generated by the devices 10 to the battery, and the electric energy demand may include a demand for storing in the battery the electric energy obtained by the devices 10. Although FIG. 1 shows an example in which two devices A, B are mounted on the vehicle as the devices 10, three or more devices 10 may be mounted on the vehicle.

The high-voltage battery 20 is a secondary battery configured to be chargeable/dischargeable, such as a lithium ion battery, and is a driving battery mounted on the vehicle as a supply/storage source of electric power etc., for example. The high-voltage battery 20 can supply electric power etc. to a starter motor or a traveling motor (not shown) via a system main relay (SMR) 21. Further, the high-voltage battery 20 can output electric power etc. to the DC-DC converter 40 via the SMR 21.

The high-voltage battery monitoring system 60 monitors the state of the high-voltage battery 20 (voltage, current, temperature, stored electricity amount, etc.). The high-voltage battery monitoring system 60 notifies, as needed, the controller 50 of the state of the high-voltage battery 20 to be monitored.

The low-voltage battery 30 is a secondary battery configured to be chargeable/dischargeable, such as a lead storage battery or a lithium ion battery, and is an auxiliary battery mounted on the vehicle as a supply/storage source of electric power etc., for example. The low-voltage battery 30 can store electric power etc. output from the high-voltage battery 20. Further, the low-voltage battery 30 may supply electric power etc. stored therein to the devices 10.

The DC-DC converter 40 can output the electric power etc. stored in the high-voltage battery 20 to the devices 10 and the low-voltage battery 30 at a predetermined voltage.

Further, the DC-DC converter 40 can output the power etc. discharged from the devices 10 to the high-voltage battery 20 at a predetermined voltage. The electric power etc. output from the DC-DC converter 40 is controlled with an output voltage value instructed by the controller 50.

The controller 50 can control the devices 10, the DC-DC converter 40, and the SMR 21 based on the state of the high-voltage battery 20, which is input from the high-voltage battery monitoring system 60. The controller 50 according to the embodiment performs control for suitably allocating supply of electric power etc. from the high-voltage battery 20 (and the low-voltage battery 30) in response to the demands for electric power etc. that occur in the devices 10.

The controller 50 can typically be configured as an electronic control unit (ECU) including a processor, a memory, an input/output interface, and the like. The controller 50 includes part or all of ECUs mounted on the vehicle, such as an ECU that can control connection/disconnection state of the SMR 21, an ECU that can control the output voltage value of the DC-DC converter 40, and an ECU that can monitor the state of the low-voltage battery 30. In the controller 50 according to the embodiment, the processor reads and executes a program stored in the memory to realize functions of a setting unit 51, a detection unit 52, and an allocation unit 53.

The setting unit 51 sets, for each priority rank, an allowable limit that indicates a limit for allowing supply of electric power etc. from the supply/storage source in response to a demand for electric power etc. The priority ranks are represented by defining in advance a priority order for supplying electric power etc. from at least the high-voltage battery 20 in response to the demands for electric power etc. that occur in the devices 10, based on predetermined categories classified in accordance with functions or performances required of the vehicle. FIG. 2 shows an example of the priority ranks defined based on the categories regarding vehicles.

In the example of FIG. 2, the priority ranks from "P1" for the highest priority to "P8" for the lowest priority are defined for the categories including safety, security, compliance, basic performance (system startup, normal traveling), parts protection, marketability (power, quietness, driving stability, nominal fuel efficiency, advanced devices), economics, and added value. In the category of compliance, the priority rank "P3" is further divided into priority ranks "P3-1" and "P3-2" for sub-categories of regulations (emission) and specifications (fuel efficiency), respectively. In the category of parts protection, the priority rank "P5" is further divided into priority ranks "P5-1" and "P5-2" for sub-categories of failure avoidance (function protection) and deterioration avoidance (life maintenance), respectively. In the category of economics, the priority rank "P7" is further divided into priority ranks "P7-1", "P7-2", "P7-3", and "P7-4" for sub-categories of fuel consumption, EV distance, electricity charges, and auxiliary device life extension, respectively. Note that the number of priority ranks, classification of categories and sub-categories, and the like can be set as desired based on the performance and functions required of the vehicle.

Various demands for electric power etc., which can occur in the vehicle, are classified as demand requirements of the priority ranks in accordance with content and purposes thereof. Further, for each priority rank, a supply requirement regarding how much electric power etc. is allowed to be supplied and a storage requirement regarding how much electric power etc. is allowed to be stored, in response to a demand for electric power etc., are determined in advance. The priority rank, the demand requirement, the supply requirement, and the storage requirement may be defined in response to each of the electric power demand and the electric energy demand.

In setting the allowable limits, the setting unit 51 first sets, for each priority rank, a lower limit value to which the electric power etc. is allowed to decrease when the electric power etc. is supplied from the supply/storage source in response to the demand for electric power etc. and an upper limit value to which the electric power etc. is allowed to increase when the electric power etc. is stored in the supply/storage source. FIG. 3A shows an example of the upper limit values and the lower limit values of electric energy that are allowable for the supply/storage source including at least the high-voltage battery 20, in response to the demands of the various priority ranks.

In the example of FIG. 3A, the electric energy stored in the supply/storage source is a current value (indicated by a solid line). In this case, with respect to the electric energy demand of the priority rank P1, the electric energy (absolute value) can be supplied until the current value reaches a lower limit value L1 unique to the priority rank P1 (supply limit), and the electric energy (absolute value) can be stored until the current value reaches an upper limit value H1 unique to the priority rank P1 (storage limit). That is, with respect to the electric energy demand of the priority rank P1 alone, changes in the electric energy within a range from the lower limit value L1 to the upper limit value H1 are allowed in order to satisfy the predetermined content regarding safety. Similarly, with respect to the electric energy demand of the priority rank P2 alone, changes in the electric energy within a range from a lower limit value L2 to an upper limit value H2 are allowed in order to satisfy the predetermined content regarding security. With respect to the electric energy demand of the priority rank P3 alone, changes in the electric energy within a range from a lower limit value L3 to an upper limit value H3 are allowed in order to satisfy the predetermined content regarding compliance. With respect to the electric energy demand of the priority rank P4 alone, changes in the electric energy within a range from a lower limit value L4 to an upper limit value H4 are allowed in order to satisfy the predetermined content regarding basic performance. With respect to the electric energy demand of the priority rank P5 alone, changes in the electric energy within a range from a lower limit value L5 to an upper limit value H5 are allowed in order to satisfy the predetermined content regarding parts protection. With respect to the electric energy demand of the priority rank P6 alone, changes in the electric energy within a range from a lower limit value L6 to an upper limit value H6 are allowed in order to satisfy the predetermined content regarding marketability. With respect to the electric energy demand of the priority rank P7 alone, changes in the electric energy within a range from a lower limit value L7 to an upper limit value H7 are allowed in order to satisfy the predetermined content regarding economics. With respect to the electric energy demand of the priority rank P8 alone, changes in the electric energy are not allowed. The predetermined content of each priority rank is appropriately set, in consideration of the type of the vehicle, the performance and the functions required of the vehicle, influence (advantages/disadvantages) of electric energy supply on the on-vehicle system and the high-voltage battery 20 based on the standard, and so forth.

Figure 3B:
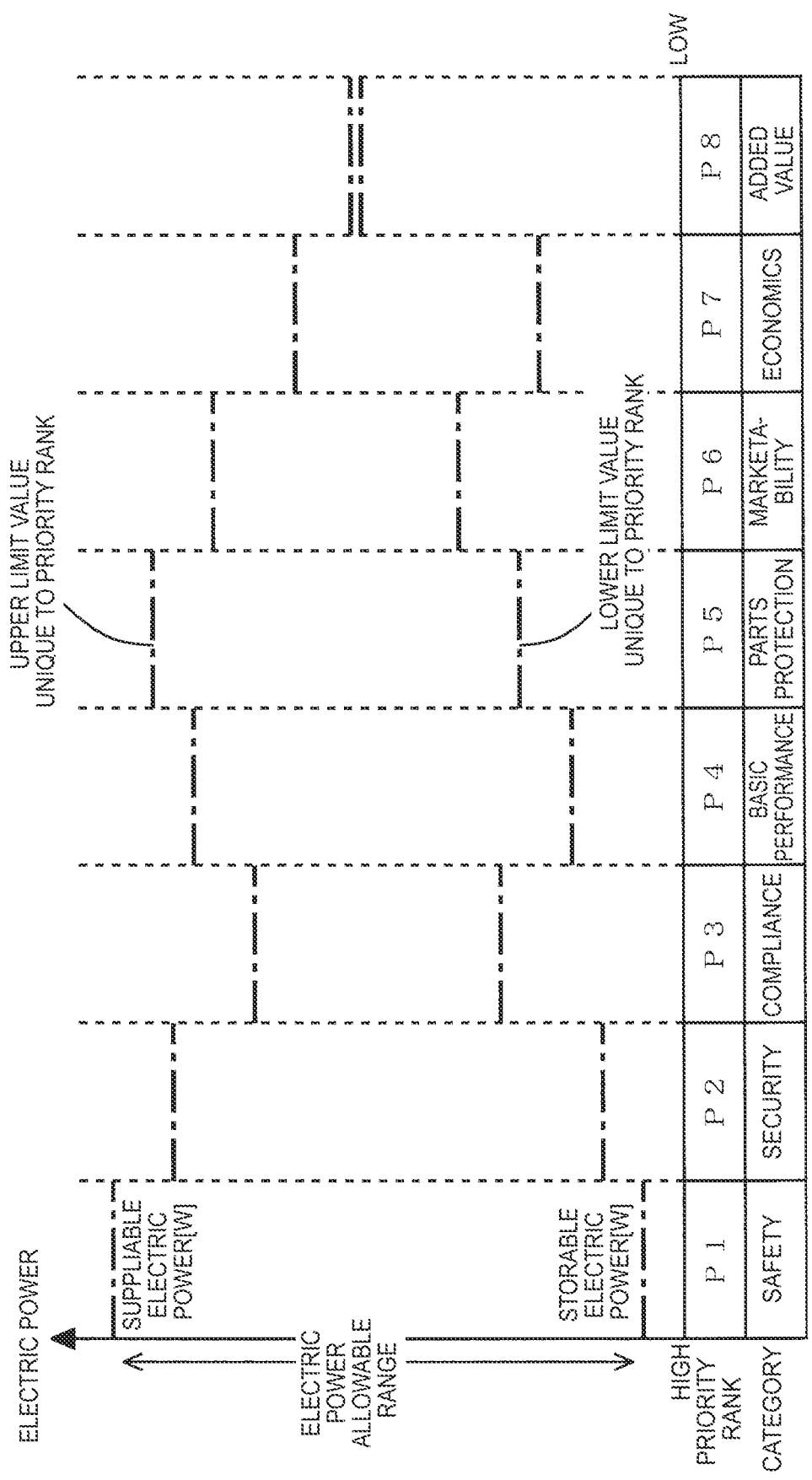
FIG. 3B shows an example of lower and upper limit values for each priority rank regarding power (electric power)

Note that the same idea as for the above-described electric energy can be applied to a range of changes in electric power, which are allowable for the supply/storage source in response to the demand of each priority rank. FIG. 3B shows an example of the upper limit values and the lower limit values of electric power that are allowable for the supply/storage source including at least the high-voltage battery 20, in response to the demands of the various priority ranks. In this case, the upper limit value is the supply limit of the electric power that can be supplied from the supply/storage source, and the lower limit value is the storage limit of the electric power that can be stored.

After determining the upper limit value and lower limit value for each priority rank alone, The setting unit 51 further determines a control upper limit value and a control lower limit value of each priority rank, which are used for allocation control (described later) performed by the controller 50. The control upper limit value and the control lower limit value are determined by performing trimming within a range of values set for higher priority ranks, with reference to the upper limit value and the lower limit value unique to each priority rank alone. The trimming is a processing in which, when an upper limit value unique to a priority rank A alone is larger than a control upper limit value set for a higher priority rank B, a control upper limit value of the priority rank A is limited to a value equal to (or smaller than) the control upper limit value of the priority rank B. The trimming is also a processing in which, when a lower limit value unique to a priority rank A alone is smaller than a control lower limit value set for the higher priority rank B, a control lower limit value of the priority rank A is limited to a value equal to (or larger than) the control lower limit value of the priority rank B. FIG. 4 shows an example in which the control upper limit value and the control lower limit value (thick solid lines) of each priority rank are determined based on the upper limit value and the lower limit value (long dashed short dashed lines) unique to each priority rank alone regarding the electric energy shown in FIG. 3A.

In FIG. 4, for the highest priority rank P1, the upper limit value and the lower limit value unique to the priority rank P1 alone are determined as the control upper limit value and the control lower limit value of the priority rank P1. For the second highest priority rank P2, the smaller one of the upper limit value unique to the priority rank P2 alone and the control upper limit value set for the priority rank P1 is determined as the control upper limit value of the priority rank P2, and the larger one of the lower limit value unique to the priority rank P2 alone and the control lower limit value set for the priority rank P1 is determined as the control lower limit value of the priority rank P2. Thus, also for the priority rank P2, the upper limit value and the lower limit value unique to the priority rank P2 alone are determined as the control upper limit value and the control lower limit value. Similarly, for the priority rank P3, the upper limit value and the lower limit value unique to the priority rank P3 alone are determined as the control upper limit value and the control lower limit value. In contrast, for the priority ranks P4 and P5, the upper limit value unique to each of the priority ranks P4 and P5 alone is larger than the control upper limit value of the priority rank P3 and the lower limit value unique to each of the priority ranks P4 and P5 alone is smaller than the control lower limit value of the priority rank P3. Therefore, the control upper limit value and the control lower limit value of the priority rank P3 are determined as the control upper limit value and the control lower limit value of each of the priority ranks P4 and P5 (trimming). The same applies to the control upper limit value of the priority rank P6 and the control lower limit value of the priority rank P7. By determining the control upper limit values and the control lower limit values with such a trimming rule, the maximum electric power or electric energy that can be supplied in response to a demand of a relatively low priority rank is limited to the maximum electric power or electric energy that can be supplied in response to a demand of a relatively high priority rank or lower. The trimming can restrain control from being performed, for example, in which although use of the supply/storage source is limited in order to satisfy the compliance (priority rank P3), the supply/storage source is used for the basic performance (priority rank P4) exceeding the limitation, that is, the basic performance is satisfied while the compliance that needs to be satisfied with priority is ignored.

Figure 5:
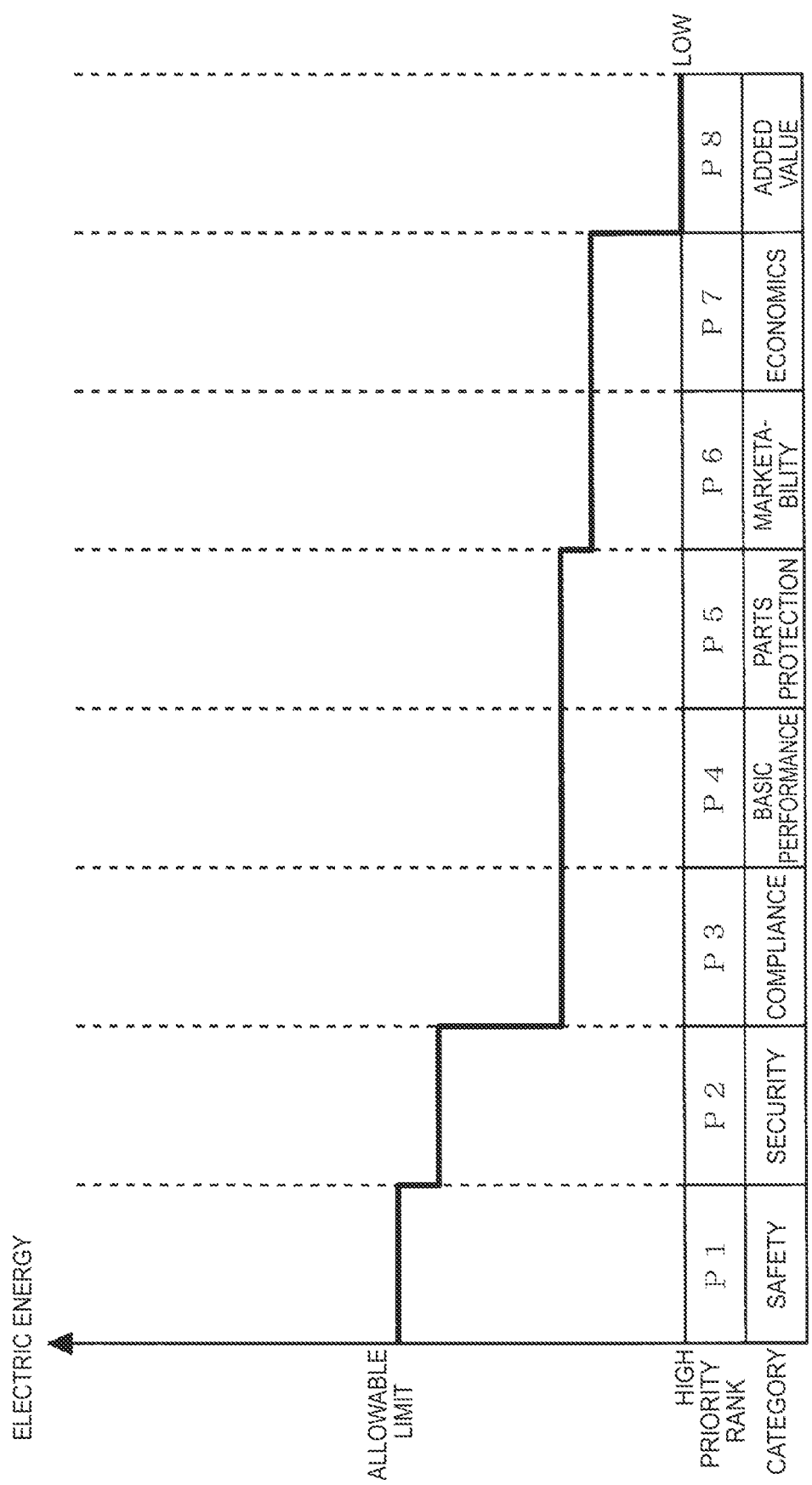
FIG. 5 shows an example in which allowable limits regarding supply of energy (electric energy) are set based on FIG. 4.

After determining the control upper limit values and the control lower limit values, the setting unit 51 sets the allowable limit for each priority rank. The allowable limit is a value indicating an upper limit of electric power or electric energy that is allowed to be supplied in response to a demand of each priority rank while electric power or electric energy to be supplied in response to demands of priority ranks higher than that priority rank is secured. For example, when the allowable limit of the priority rank P3 is set to 50 Ws and the total electric energy supplied in response to the demands of the priority ranks P1 and P2 higher than the priority rank 3 is 40 Ws, electric energy of up to 10 Ws (=50-40) is allowed to be supplied in response to the demand of the priority rank P3. However, when the total electric energy supplied in response to the demands of the priority ranks P1 and P2 is 60 Ws, the electric energy is not allowed to be supplied in response to the demand of the priority rank P3 because the total electric energy supplied in response to the demands of the priority ranks P1 and P2 exceeds the allowable limit of the priority rank P3. In the case shown in FIG. 4, the allowable limit regarding the supply of electric energy can be calculated with a calculation "current value−control lower limit". FIG. 5 shows an example in which the allowable limits (solid line) regarding the supply of electric energy are set based on the current values and the control lower limit values shown in FIG. 4. Based on the current values and the control upper limit values shown in FIG. 4, the allowable limits regarding storage of electric energy can be calculated with a calculation "control upper limit value−current value". By incorporating the allowable limits regarding the storage of electric energy into the setting, it is possible to vary the allowable limits regarding the supply of electric energy shown in FIG. 5, for example, so that the electric energy increases, thereby expanding an allowable range.

The detection unit 52 detects demands for electric power etc., which occur in the devices 10. In addition, the detection unit 52 acquires information on electric power or electric energy required by the generated demands for electric power etc. and the priority ranks of the generated demands for electric power etc. The detection unit 52 may acquire the information by receiving the information from the device 10 that detects the demand for electric power, etc. Alternatively, the controller 50 may have a table etc. in which the demands for electric power etc., which occur in the devices 10, and required electric power or electric energy and the priority ranks are associated with one another, so that the detection unit 52 acquires the information from the table in accordance with the detected demands for electric power etc.

The allocation unit 53 performs control, each time the detection unit 52 detects the demand for electric power etc., for allocating, in order of the priority rank, electric power or electric energy supplied from the supply/storage source in response to the demands for electric power etc., which occur in the vehicle, based on the allowable limit for each priority rank, which is set by the setting unit 51. The allocation control will be described in detail below.

Control

The allocation control performed by the controller 50 that is the supply-demand control device according to the embodiment of the disclosure will be described with reference to the drawings. In the following, the allocation control of each of the electric power demand and the electric energy demand will be described.

(1) Electric Energy Allocation Control (1-1) Flowchart

Figure 6A:
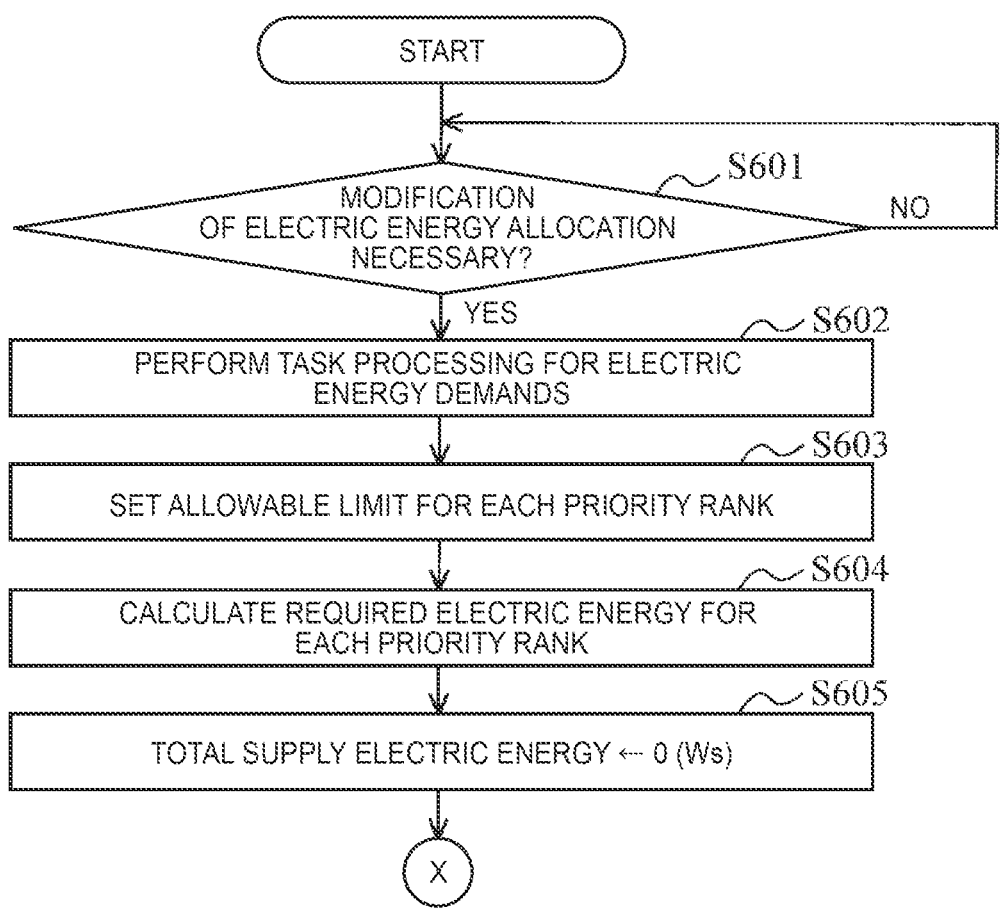
FIG. 6A is a flowchart of energy (electric energy) allocation control performed by a controller in response to energy (electric energy) demands.
Figure 6B:
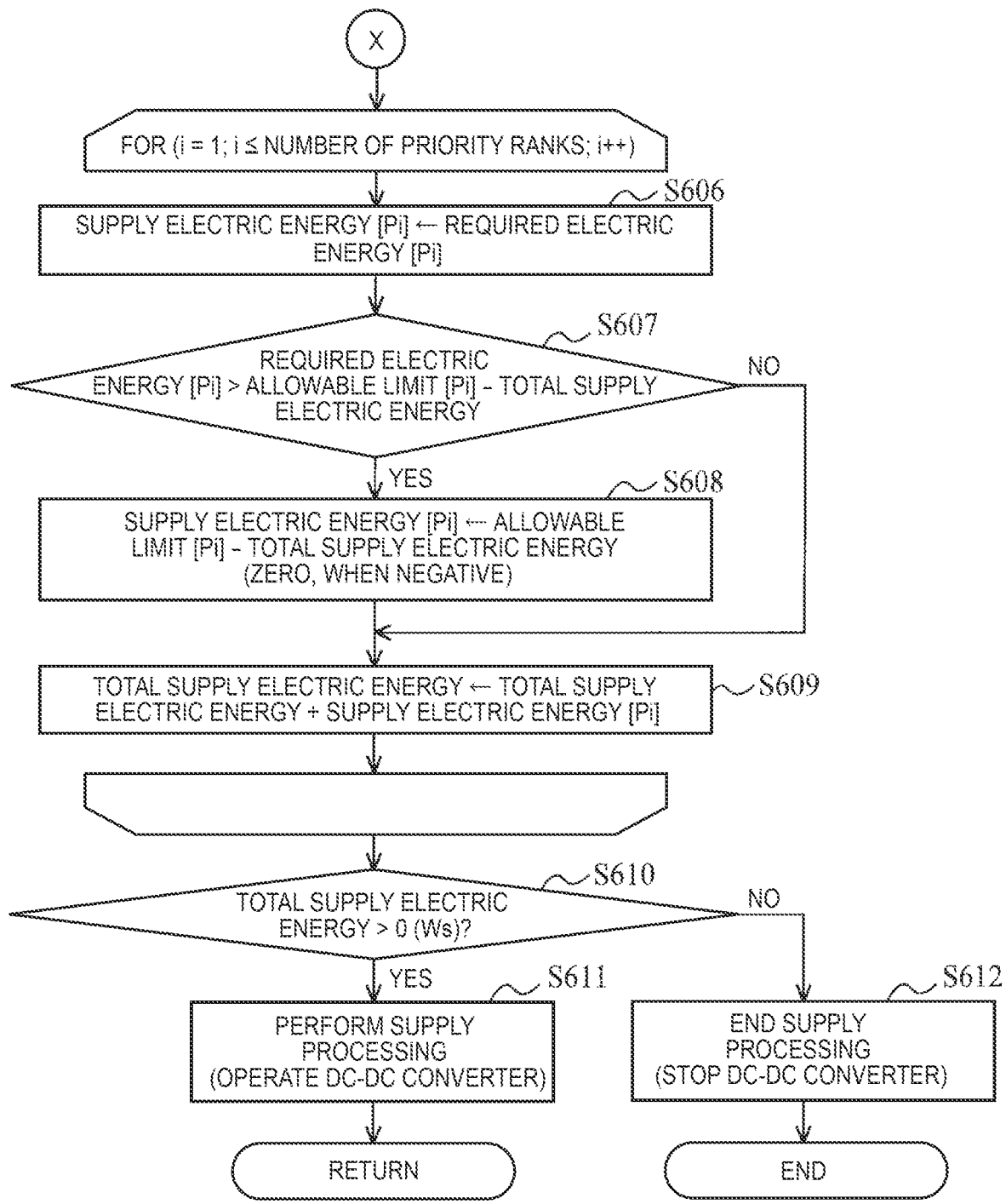
FIG. 6B is a flowchart of the energy (electric energy) allocation control performed by the controller in response to the energy (electric energy) demands.

FIGS. 6A and 6B are flowcharts showing a processing procedure of electric energy allocation control performed by the controller 50 for the electric energy demands that occur in the devices 10. Processes of FIG. 6A and Processes of FIG. 6B are connected by a connector X. The electric energy allocation control shown in FIGS. 6A and 6B is started when the controller 50 detects occurrences of new electric energy demands, for example, at startup of the devices 10.

Step S601: the controller 50 determines whether modification of the electric energy allocation, which requires recalculation of the allocation of electric energy, is necessary. The case where the modification of the electric energy allocation is necessary includes, for example, a case where the electric energy demands in the vehicle change due to an electric energy demand that newly occurs or an electric energy demand that stops, or a case where the electric energy supply changes depending on the state of the vehicle (the state of the high-voltage battery 20, the states of various systems, etc.). Alternatively, the electric energy allocation may be modified at predetermined time intervals. When it is determined that the modification of the electric energy allocation is necessary (Yes in step S601), the process proceeds to step S602.

Step S602: the controller 50 performs task processing for the electric energy demands. In the task processing, a task is assigned to the new electric energy demand, or a task assigned to the stopped electric energy demand is deleted. When the task processing for the electric energy demand is completed, the process proceeds to step S603.

Step S603: the controller 50 sets, for each priority rank (for each sub-category, if there are sub-categories), the allowable limit that is the upper limit value of electric energy that can be supplied in response to the electric energy demand. When the allowable limit is set for each priority rank, the process proceeds to step S604.

Step S604: the controller 50 calculates, for each priority rank (for each sub-category, if there are sub-categories), a required electric energy that is the electric energy required by the electric energy demand. This required electric energy is calculated by adding all the electric energy required for the tasks of the priority ranks. When the required electric energy is calculated for each priority rank, the process proceeds to step S605.

Step S605: the controller 50 initializes a "total supply electric energy" indicating a total value of the electric energy supplied from the high-voltage battery 20, by substituting zero (Ws) into the total supply electric energy. When the total supply electric energy is initialized, the process proceeds to step S606.

Step S606: the controller 50 sets a required electric energy [Pi] of a priority rank Pi as a supply electric energy [Pi] for a priority rank Pi. When the setting of the supplied electric energy [Pi] is completed, the process proceeds to step S607.

Step S607: the controller 50 determines whether the required electric energy [Pi] of the priority rank Pi is larger than a value A. The value A is obtained by subtracting the total supply electric energy supplied so far in response to the demands of the priority ranks higher than the priority rank Pi from the allowable limit [Pi] of the priority rank Pi. This determination is made in order to determine whether all the required electric energy [Pi] of the priority rank Pi can be satisfied. When the required electric energy [Pi] of the priority rank Pi is larger than the value A (Yes in step S607), it is determined that all the required electric energy [Pi] cannot be satisfied, and the process proceeds to step S608. When the required electric energy [Pi] of the priority rank Pi is equal to or smaller than the value A (No in step S607), it is determined that all the required electric energy [Pi] can be satisfied, and the process proceeds to step S609.

Step S608: the controller 50 resets the supply electric energy [Pi] of the priority rank Pi to the value A obtained by subtracting the total supply electric energy supplied so far from the allowable limit [Pi] of the priority rank Pi. However, when the value A is negative, the supply electric energy [Pi] is set to zero (lower limit guard). When the supply electric energy [Pi] of the priority rank Pi is reset, the process proceeds to step S609.

Step S609: the controller 50 sets (updates) the total supply electric energy by adding the supply electric energy [Pi] of the priority rank Pi obtained in step S606 or step S608 to the total supply electric energy supplied so far. When the setting (updating) of the total supply electric energy is completed, the process proceeds to step S606.

The processes in steps S606 to S609 are performed in descending order from the highest priority rank, and are continued until the total supply electric energy is updated by the supply electric energy [Pi] of the lowest priority rank.

Step S610: the controller 50 determines whether the total supply electric energy exceeds zero (Ws). This determination is made so that the controller 50 determines whether there is no electric energy demand from all the devices 10. When the total supplied electric energy exceeds zero (Ws) (Yes in step S610), it is determined that there are still electric energy demands, and the process proceeds to step S611. When the total supply electric energy becomes zero (Ws) (No in step S610), it is determined that there is no longer an electric energy demand, and the process proceeds to step S612.

Step S611: the controller 50 performs (continues) supply processing for supplying the total supply electric energy, which is set in step S609, from the high-voltage battery 20 to the devices 10 by operating the DC-DC converter 40 to control the output voltage value. When the supply processing is performed, the process returns to step S601.

Step S612: the controller 50 stops the DC-DC converter 40 to end the supply processing for supplying the electric energy from the high-voltage battery 20 to the devices 10. When the supply processing ends, the electric energy allocation control ends.

(1-2) Specific Example

Figure 8:
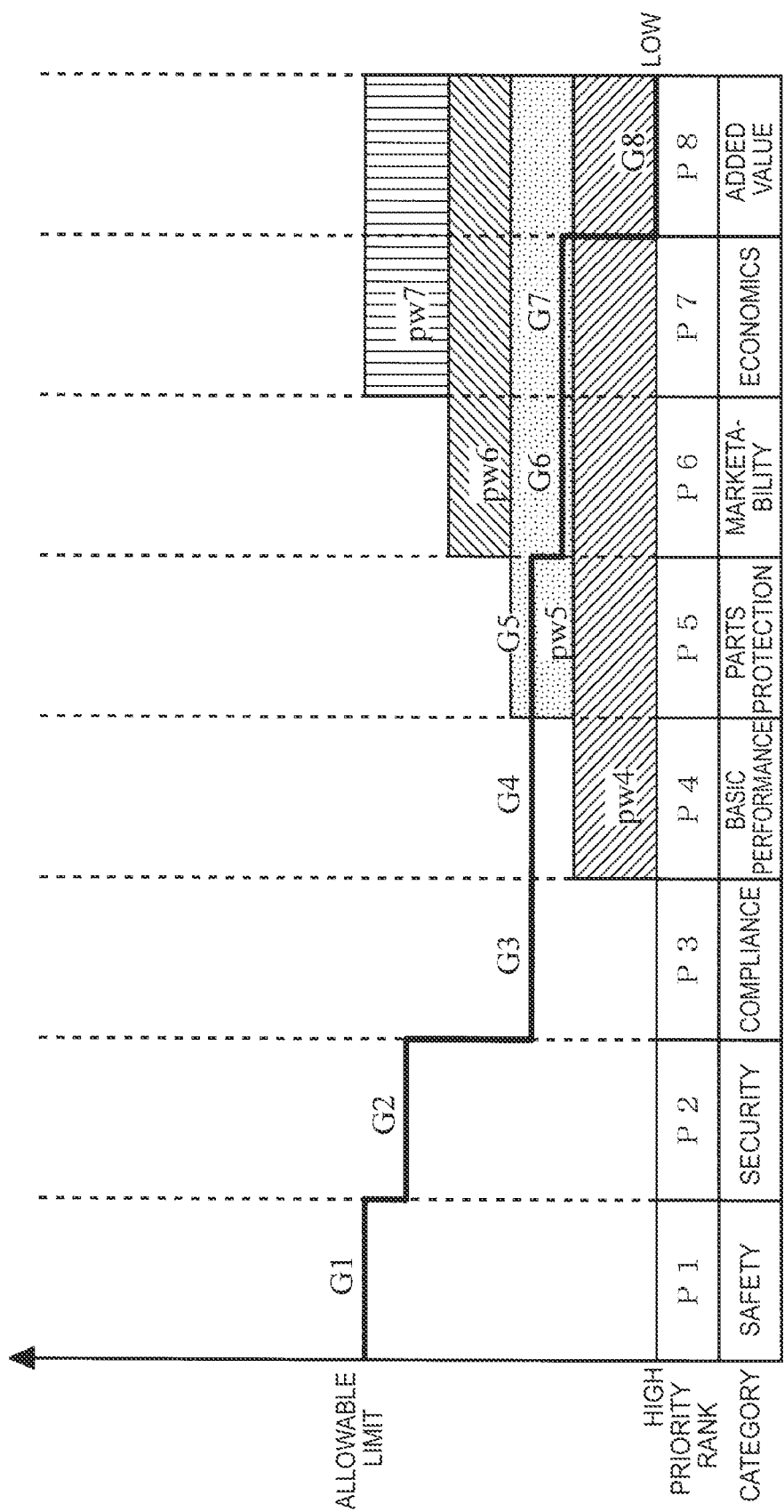
FIG. 8 shows an example of the respective energy (electric energy) demands of the priority ranks in the energy (electric energy) providing process.

A specific example of the processes performed in steps S606 to S609 in FIG. 6B described above will be described with reference to FIGS. 7 and 8. FIGS. 7 and 8 are diagrams illustrating an example of the electric energy demands in a situation where electric energy is provided from the high-voltage battery 20 to the devices 10. FIG. 7 shows an example of the electric energy demands that can occur in the devices 10 regarding the electric energy providing process.

In FIG. 7, as demand requirements into which the electric energy demands are classified, the basic performance of the priority rank P4, the parts protection of the priority rank P5, the marketability of the priority rank P6, and the economics of the priority rank P7 are defined in advance. Further, in FIG. 7, although it is merely an example, predetermined supply requirements regarding the providing process of the electric energy are defined beforehand. FIG. 8 shows an example regarding the providing process of the electric energy, in which a demand for electric energy pw4 (Ws) for the basic performance of the priority rank P4, a demand for electric energy pw5 (Ws) for the parts protection of the priority rank P5, a demand for electric energy pw6 (Ws) for the marketability of the priority rank P6, and a demand for electric energy pw7 (Ws) for the economics of the priority rank P7 occur.

Examples of the electric energy demand in the providing process, which is generated regarding the basic performance of the priority rank P4, include a demand for avoiding a situation where the vehicle cannot be started. Thus, examples of the demand include a demand requiring electric energy necessary for a reprogramming process. The reprogramming process is a process of updating online a software program of the ECU installed in the vehicle and is performed during parking or after completion of traveling. The electric energy necessary for performing the reprogramming process can be determined based on an execution time (time period from start to completion) and operation electric power of the reprogramming process in the ECU to be updated. As the supply requirement for the electric energy demand for the providing process, which is generated regarding the basic performance of the priority rank P4, a requirement is defined, for example, that the electric energy can be supplied from the high-voltage battery 20 within a range up to the lower limit SOC+α that enables cranking operation.

Examples of the electric energy demand in the providing process, which occurs regarding the parts protection of the priority rank P5, include a demand for avoiding exhaustion of the low-voltage battery 30 or a demand for ensuring durability of the low-voltage battery 30. Thus, examples of the demand includes a demand requiring electric energy that is necessary for preventing decrease in the amount of electricity stored in the low-voltage battery 30 due to self-discharge or dark current generated while the vehicle is left for a long time (i.e., while the vehicle is parked etc.). The electric energy necessary for preventing the decrease in the amount of electricity stored in the low-voltage battery 30 can be determined as the electric energy provided from the high-voltage battery 20 in order to charge the low-voltage battery 30 to a predetermined amount of electricity stored. The timing of provision is determined based on a speed of self-discharge, the amount of dark current, and the like, and the electric energy provided depends on the amount of electricity stored in the low-voltage battery 30. As the supply requirement for the electric energy demand in the providing process, which occurs regarding the parts protection of the priority rank P5, a requirement is defined, for example, that the electric energy can be supplied from the high-voltage battery 20 within a range that can protect the DC-DC converter 40 from overheating during the provision.

Examples of another electric energy demand in the providing process, which occurs regarding the parts protection of the priority rank P5, include a demand, for example, requiring electric energy necessary for regular operation devices (electronic mirror, lighting in the cabin, etc.) that operate in conjunction with every regular operation pattern such as opening/closing of the vehicle door or turning-off of ignition. The electric energy necessary for operation of the regular operation devices can be determined based on the electric power consumption and the operation time of the devices (a time guard may be provided).

Examples of the electric energy demand in the providing process, which occurs regarding the marketability of the priority rank P6, include a demand for guaranteeing the operation of the advanced devices. Thus, examples of the demand includes a demand requiring electric energy necessary for manual operation of the devices based on a user's operation or automated operation of the devices based on system instructions during non-traveling. The electric energy necessary for the operation of specific devices can be determined based on the operation time and the operation electric power. The electric energy for the devices with limited operation time can be easily calculated. However, for a device with non-limited operation time, it is difficult to determine the time until completion of operation. Therefore, a predetermined time limit may be set to determine the electric energy. As the supply requirement for the electric energy demand in the providing process, which occurs regarding the marketability of the priority rank P6, a requirement is defined, for example, that the electric energy can be supplied from the high-voltage battery 20 within such a range that fluctuation in the stored electricity amount during parking falls within the upper and lower limits of ΔSOC so as to impact the user after riding in the vehicle.

Examples of the electric energy demand in the providing process, which occurs regarding the economics of the priority rank P7, include a demand requiring the electric energy necessary for extending the life of the low-voltage battery 30 (life extension) when multiple demands occur such as the electric energy demand for avoiding the decrease in the amount of electricity stored in the low-pressure battery 30, the electric energy demand for operating the regular operation devices, and the electric energy demand for operating the specific devices.

In the process of FIG. 6B, in the first step S606, supply electric energy [P1] for the highest priority rank P1 is set. In the example of the providing process shown in FIG. 8, the electric energy demand of the priority rank P1 has not occurred. Therefore, the required electric energy [P1] is zero (Ws), and thus the supply electric energy [P1] is also set to zero (Ws). In the subsequent step S607, the required electric energy [PT] is compared, in magnitude, with the value A obtained by subtracting the total supply electric energy from the allowable limit [P1]. However, since the required electric energy [P1] and the total supply electric energy are both zero (Ws) in response to the allowable limit [P1]=GT (Ws), the determination result in step S607 is "No". In the subsequent step S609, the supply electric energy [P1] of zero (Ws) is added to the total supply electric energy of zero (Ws), and thus, the total supply electric energy does not change and remains zero (Ws).

Regarding the setting of the supply electric energy [P2] for the priority rank P2 and the setting of the supply electric energy [P3] for the priority rank P3, there is no electric energy demand in the priority ranks P2 and P3. Therefore, even when the processes of steps S606 to S609 are performed, the total supply electric energy remains zero (Ws).

Subsequently, the supply electric energy [P4] for the priority rank P4 is set. In the example of the providing process shown in FIG. 8, the required electric energy [P4]=pw4 (Ws) of the priority rank P4 has occurred. Therefore, the required electric energy [P4]=pw4 (Ws) is substituted into the supply electric energy [P4] in step S606. In the subsequent step S607, the required electric energy [P4] is compared, in magnitude, with the value A obtained by subtracting the total supply electric energy from the allowable limit [P4]. In this process, since the total supply electric energy is zero (Ws), the required electric energy [P4]=pw4 (Ws) is smaller than the allowable limit [P4]=G4 (Ws). Thus, the determination result in step S607 is "No". In the subsequent step S609, the supply electric energy [P4] of pw4 (Ws) is added to the total supply electric energy of zero (Ws), and the total supply electric energy becomes pw4 (Ws).

Subsequently, the supply electric energy [P5] for the priority rank P5 is set. In the example of the providing process shown in FIG. 8, the required electric energy [P5]=pw5 (Ws) of the priority rank P5 has occurred. Therefore, the required electric energy [P5]=pw5 (Ws) is substituted into the supply electric energy [P5] in step S606. In the subsequent step S607, the required electric energy [P5] is compared, in magnitude, with the value A obtained by subtracting the total supply electric energy from the allowable limit [P5]. In this process, the value A=G5−pw4 (Ws) obtained by subtracting the total supply electric energy=pw4 (Ws) from the allowable limit [P5]=G5 (Ws) is smaller than the required electric energy [P5]=pw5 (Ws). Thus, the determination result in step S607 is "Yes". In the subsequent step S608, the value A=G5−pw4 (Ws) obtained in step S607 is set as the supply electric energy [P5] for the priority rank P5. That is, electric energy supply is allowed for a part of the electric energy demand of the priority rank P5 with the allowable limit [P5] being the upper limit. In the subsequent step S609, the supply electric energy [P5]=G5−pw4 (Ws) is added to the total supply electric energy of pw4 (Ws), and the total supply electric energy becomes G5 (Ws). That is, the total supply electric energy is the allowable limit [P5] for the priority rank P5.

Subsequently, the supply electric energy [P6] for the priority rank P6 is set. In the example of the providing process shown in FIG. 8, the required electric energy [P6]=pw6 (Ws) of the priority rank P6 has occurred. Therefore, the required electric energy [P6]=pw6 (Ws) is substituted into the supply electric energy [P6] in step S606. In the subsequent step S607, the required electric energy [P6] is compared, in magnitude, with the value A obtained by subtracting the total supply electric energy from the allowable limit [P6]. In this process, the value A=G6−G5 (Ws) obtained by subtracting the total supply electric energy=G5 (Ws) from the allowable limit [P6]=G6 (Ws) is negative and smaller than the required electric energy [P5]=pw6 (Ws). Therefore, the determination result in step S607 is "Yes". In the subsequent step S608, since the value A=G6−G5 obtained in step S607 is negative, zero (Ws) is substituted into the supply electric energy [P6] for the priority rank P6. That is, since the electric energy allocated so far to the electric energy demands of the priority ranks P1 to P5 has already exceeded the allowable limit, the electric energy is not allocated at all to the electric energy demand of the priority rank P6, and no electric energy is supplied thereto.

Regarding the setting of the supply electric energy [P7] for the priority rank P7 and the setting of the supply electric energy [P8] for the priority rank P8, the electric energy allocated so far to the electric energy demands of the priority ranks P1 to P5 has already exceeded the allowable limit, as with the priority rank P6. Therefore, the electric energy is not allocated at all to the electric energy demands of the priority ranks P7 and P8, and no electric energy is supplied thereto.

With this electric energy allocation control, when the electric energy demands occur in the devices 10, it is possible to appropriately adjust the allocation of the electric energy supply to the devices 10 within a range corresponding to the storage state of the high-voltage battery 20 that is the supply/storage source of electric energy.

Here, a case where the trimming of the control upper limit values and the control lower limit values is not performed will be described as a comparison. For example, in FIG. 8, it is assumed that the allowable limit [P7] of the priority rank P7 is set to the lower limit value of the priority rank alone shown in FIG. 3A (allowable limit [P7]=G7 or larger). In this case, the required electric energy [P7]=pw7 (Ws) and the value A=G7−G5 (Ws) obtained by subtracting the total supply electric energy from the allowable limit [P7] that has not been trimmed are not zero. Therefore, all the required electric energy [P7] (step S606) or part of the required electric energy [P7] (step S608) is set as the supply electric energy [P7], electric energy supply is allowed for all of or part of the electric energy demand of the priority rank P7.

Therefore, when trimming of the control upper limit values and the control lower limit values is not performed as described above, electric energy is not supplied at all in response to the electric energy demand of the priority rank P6, but electric energy is supplied in response to part of the electric energy demand of the priority rank P7. That is, supply and demand of electric energy are made against the priority ranks, so the allocation is not appropriate. Therefore, in the embodiment, by performing trimming of the control upper limit value and the control lower limit value, appropriate supply and demand of electric energy based on the priority ranks is secured.

(2) Electric Power Allocation Control

Similar to the electric energy allocation control described above, the electric power allocation control can be performed for the electric power demands that occur in the devices 10.

Figure 9A:
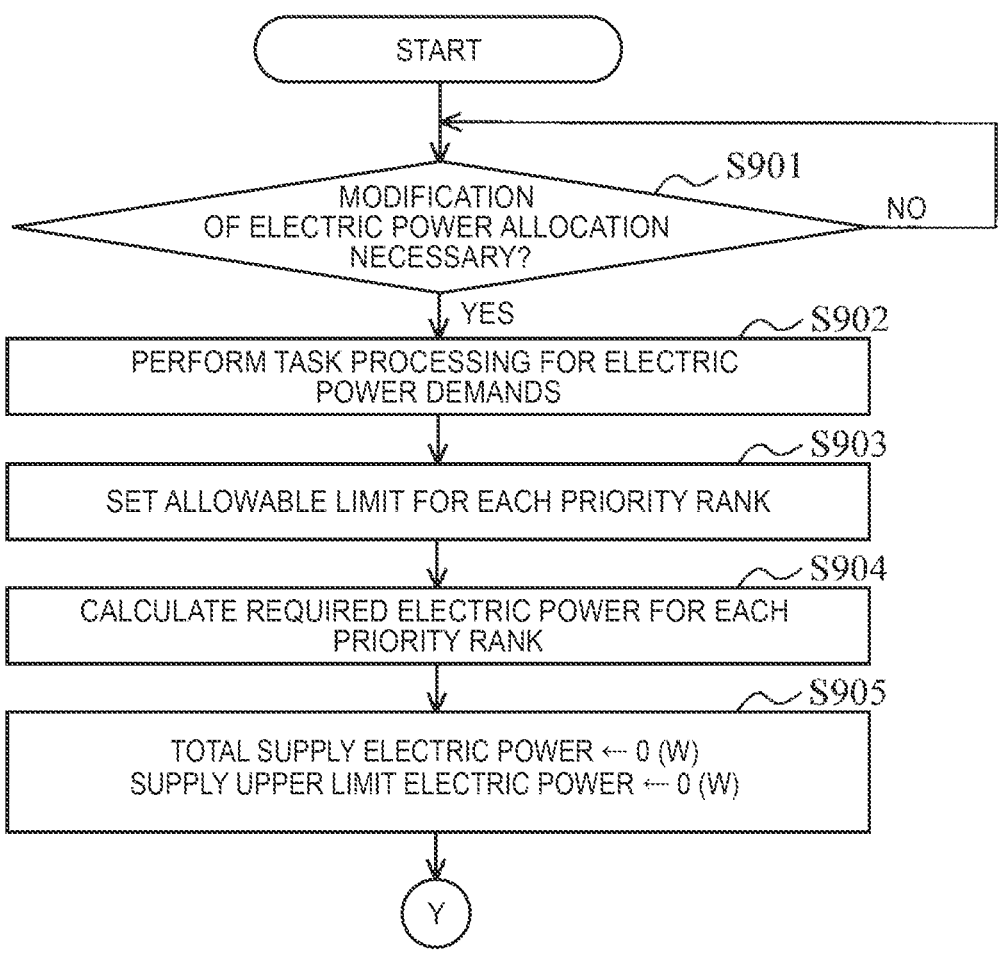
FIG. 9A is a flowchart of power (electric power) allocation control performed by the controller in response to power (electric power) demands.
Figure 9B:
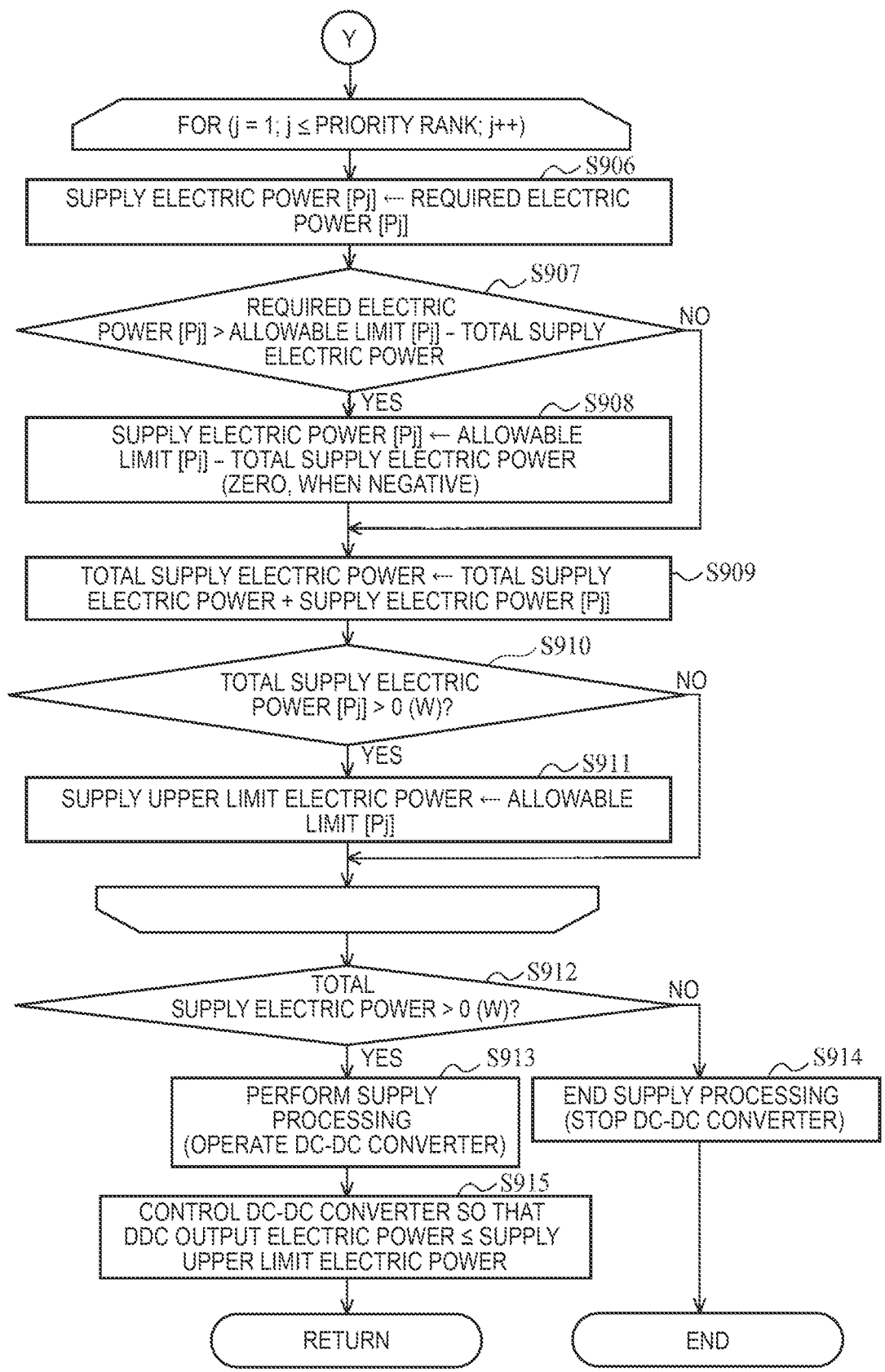
FIG. 9B is a flowchart of the power (electric power) allocation control performed by the controller in response to the power (electric power) demands.

FIGS. 9A and 9B are flowcharts showing a processing procedure of the electric power allocation control performed by the controller 50 for the electric power demands that occur in the devices 10. Processes of FIG. 9A and processes of FIG. 9B are connected by a connector Y. The electric power allocation control shown in FIGS. 9A and 9B is started when the controller 50 detects occurrences of new electric power demands, for example, at startup of the devices 10.

Step S901: the controller 50 determines whether modification of the electric power allocation, which requires recalculation of the allocation of electric power, is necessary. The case where the modification of the electric power allocation is necessary includes, for example, a case where the electric power demands in the vehicle change due to an electric power demand that newly occurs or an electric power demand that stops, or a case where the situation of the electric power supply changes depending on the state of the vehicle (the state of the high-voltage battery 20, the states of various systems, etc.). Alternatively, the electric power allocation may be modified at predetermined time intervals. When it is determined that the modification of the electric power allocation is necessary (Yes in step S901), the process proceeds to step S902.

Step S902: the controller 50 performs task processing for the electric power demands. In the task processing, a task is assigned to the new electric power demand, or a task assigned to the stopped electric power demand is deleted. When the task processing for the electric power demand is completed, the process proceeds to step S903.

Step S903: the controller 50 sets, for each priority rank (for each sub-category, if there are sub-categories), the allowable limit that is the upper limit value of electric power that can be supplied in response to the electric power demand. When the allowable limit is set for each priority rank, the process proceeds to step S904.

Step S904: the controller 50 calculates, for each priority rank (for each sub-category, if there are sub-categories), a required electric power that is the electric power required by the electric power demand. This required electric power is calculated by adding all the electric power required for the tasks of the priority ranks. When the required electric power is calculated for each priority rank, the process proceeds to step S905.

Step S905: the controller 50 initializes a "total supply electric power" and a "supply upper limit electric power" indicating a total value of the electric power supplied from the high-voltage battery 20 and an upper limit value of electric power that can be supplied from the high-voltage battery 20, respectively, by substituting zero (W) into each of the total supply electric power and the supply upper limit electric power. When the total supply electric power and the supply upper limit electric power are initialized, the process proceeds to step S906.

Step S906: the controller 50 sets a required electric power [Pj] of a priority rank Pj as a supply electric power [Pj] for a priority rank Pj. When the setting of the power supply [Pj] is completed, the process proceeds to step S907.

Step S907: the controller 50 determines whether the required electric power [Pj] of the priority rank Pj is larger than a value B. The value B is obtained by subtracting the total supply electric power being supplied in response to the demands of the priority ranks higher than the priority rank Pj from the allowable limit [Pj] of the priority rank Pj. This determination is made in order to determine whether all the required electric power [Pj] of the priority rank Pj can be satisfied. When the required electric power [Pj] of the priority rank Pj is larger than the value B (Yes in step S907), it is determined that all the required electric power [Pj] cannot be satisfied, and the process proceeds to step S908. When the required electric power [Pj] of the priority rank Pj is equal to or smaller than the value B (No in step S907), it is determined that all the required electric power [Pj] can be satisfied, and the process proceeds to step S909.

Step S908: the controller 50 resets the supply electric power [Pj] of the priority rank Pj to the value B obtained by subtracting the total supply electric power being supplied from the allowable limit [Pj] of the priority rank Pj. However, when the value B is negative, the supply electric power [Pj] is set to zero (lower limit guard). When the supply electric power [Pj] of the priority rank Pj is reset, the process proceeds to step S909.

Step S909: the controller 50 sets (updates) the total supply electric power by adding the supply electric power [Pj] of the priority rank Pj obtained in step S906 or step S908 to the total supply electric power being supplied. When the setting (updating) of the total supply electric power is completed, the process proceeds to step S910.

Step S910: the controller 50 determines whether the supply electric power [Pj] of the priority rank Pj exceeds zero (W). When the supply electric power [Pj] exceeds zero (W) (Yes in step S910), the process proceeds to step S911. When the supply electric power [Pj] is zero (W) (No in step S910), the process proceeds to step S906.

Step S911: the controller 50 substitutes the allowable limit [Pj] of the priority rank Pj into the supply upper limit electric power. With this process, the supply upper limit electric power is set to an allowable limit that is always equal to the total supply electric power (upper limit guard). When the supply upper limit electric power is set, the process proceeds to step S906.

The processes in steps S906 to S911 are performed in descending order from the highest priority rank, and are continued until the total supply electric power is updated by the supply electric power [Pj] of the lowest priority rank and the supply upper limit electric power is set.

Step S912: the controller 50 determines whether the total supply electric power exceeds zero (W). This determination is made so that the controller 50 determines whether there is no electric power demand from all the devices 10. When the total supplied electric power exceeds zero (W) (Yes in step S912), it is determined that there are still electric power demands, and the process proceeds to step S913. When the total supplied electric power becomes zero (W) (No in step S912), it is determined that there is no longer an electric power demand, and the process proceeds to step S914.

Step S913: the controller 50 performs (continues) supply processing for supplying the total supply electric power, which is set in step S909, from the high-voltage battery 20 to the devices 10 by operating the DC-DC converter 40 to control the output voltage value. When the supply processing is performed, the process proceeds to step S915.

Step S914: the controller 50 stops the DC-DC converter 40 to end the supply processing for supplying the electric power from the high-voltage battery 20 to the devices 10. When the supply processing ends, the electric power allocation control ends.

Step S915: the controller 50 controls the output voltage value to instruct the DC-DC converter 40 so that the electric power output from the DC-DC converter 40 is limited to be equal to or less than the supply upper limit electric power set in step S911. This control makes it possible to restrain electric power exceeding the limit of supply capacity of the high-voltage battery 20 from being supplied to the devices 10.

With this electric power allocation control, when the electric power demands occur in the devices 10, it is possible to appropriately adjust the allocation of the electric power supply to the devices 10 within a range of supply capacity of the high-voltage battery 20 that is the supply/storage source of electric power.

Application Example

Next, an application example regarding the setting of the allowable limit for each priority rank will be described with reference to FIGS. 10 to 15. In this application example, the allowable limit is set by also using an "occurrence frequency rank" that is defined in advance based on the frequency of occurrence of the demand for electric power etc. The occurrence frequency rank is set and held by the setting unit 51 of the controller 50.

The occurrence frequency rank is defined in accordance with the frequency of occurrence of the demand for electric power etc. For example, as shown in FIG. 10, an occurrence frequency rank F1 is assigned to a regular demand for electric power etc. such as a demand that occurs every time the vehicle travels, an occurrence frequency rank F2 is assigned to a demand for electric power etc., which occurs with high frequency with respect to most users, an occurrence frequency rank F3 is assigned to a demand for electric power etc., which occurs with a medium frequency with respect to a certain number of users, an occurrence frequency rank F4 is assigned to a demand for electric power etc., which occurs with a low frequency with respect to a limited number of users, and an occurrence frequency rank F5 is assigned to a demand for electric power etc., which occurs in a rare case under a special condition of the vehicle. FIG. 10 is a diagram showing an example of the occurrence frequency ranks defined for the specifications (fuel efficiency) of the priority rank P3-2.

Examples of the demand for electric power etc. of the occurrence frequency rank F1 include demands from the regular operation devices (electronic mirror etc.) that regularly operate in conjunction with the regular operation pattern such as opening/closing of the vehicle door. The demand for electric power etc. of the occurrence frequency rank F1 has a large influence on the fuel efficiency. Therefore, a supply requirement may be set so that deterioration of the fuel efficiency becomes almost zero. Further, examples of the demand for electric power etc. of the occurrence frequency rank F3 include a demand from the low-voltage battery 30 for preventing the decrease in the stored electricity amount. The demand for electric power etc. of the occurrence frequency rank F3 has a small influence on the fuel efficiency. Therefore, a supply requirement may be set that allows deterioration of the fuel efficiency by a small amount. Examples of the demand for electric power etc. of the occurrence frequency rank F5 include a demand from the ECU for performing the reprogramming processing of updating the software program online. Such a demand for electric power etc. of the occurrence frequency rank F5 often occurs in processes that need to be performed with priority over the influence on fuel efficiency. Therefore, a supply requirement may be set that allows deterioration of fuel efficiency.

Figure 12:
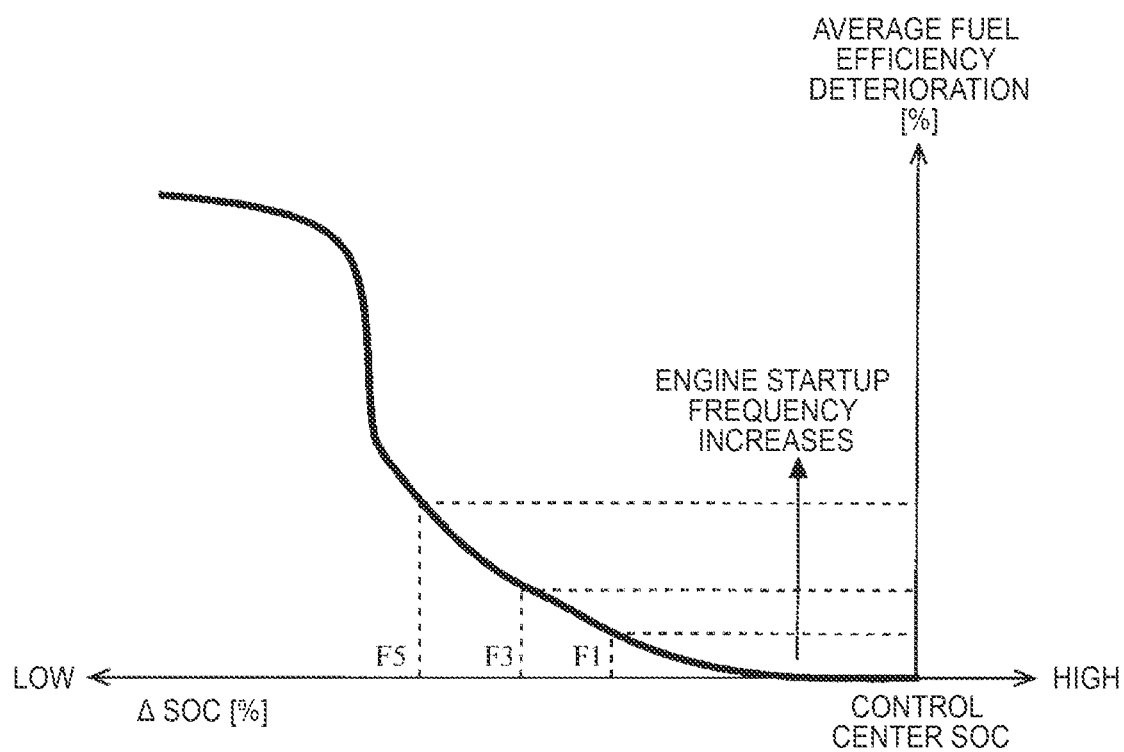
FIG. 12 illustrates a relationship between a setting of the allowable limits based on the occurrence frequency ranks and deterioration of fuel efficiency.

FIGS. 11 and 12 show specific examples of setting supply requirements for the specifications (fuel efficiency) of the priority rank P3-2 based on the occurrence frequency ranks. For the demand for electric power etc. of the occurrence frequency rank F1, a supply requirement is set so that a decrease ΔSOC from a control center SOC of the high-voltage battery 20 is kept small (FIG. 11). By keeping the decrease ΔSOC from the original control center SOC small, it is possible to reduce the frequency of starting the engine for power generation in order to return the amount of electricity stored in the high-voltage battery 20 to the control center SOC, thereby making the deterioration of fuel efficiency almost zero (FIG. 12). On the other hand, for the demand for electric power etc. of the occurrence frequency rank F5, a supply requirement is set that allows a large decrease ΔSOC from the control center SOC of the high-voltage battery 20 (FIG. 11). When the decrease ΔSOC from the original control center SOC increases, the frequency of starting the engine for charging the high-voltage battery 20 increases, which deteriorates the fuel efficiency. However, the supply of electric power or electric energy in response to the demand for electric power etc. from the devices 10 is performed with higher priority in order to normally operate the devices 10 (FIG. 12).

Figure 13:
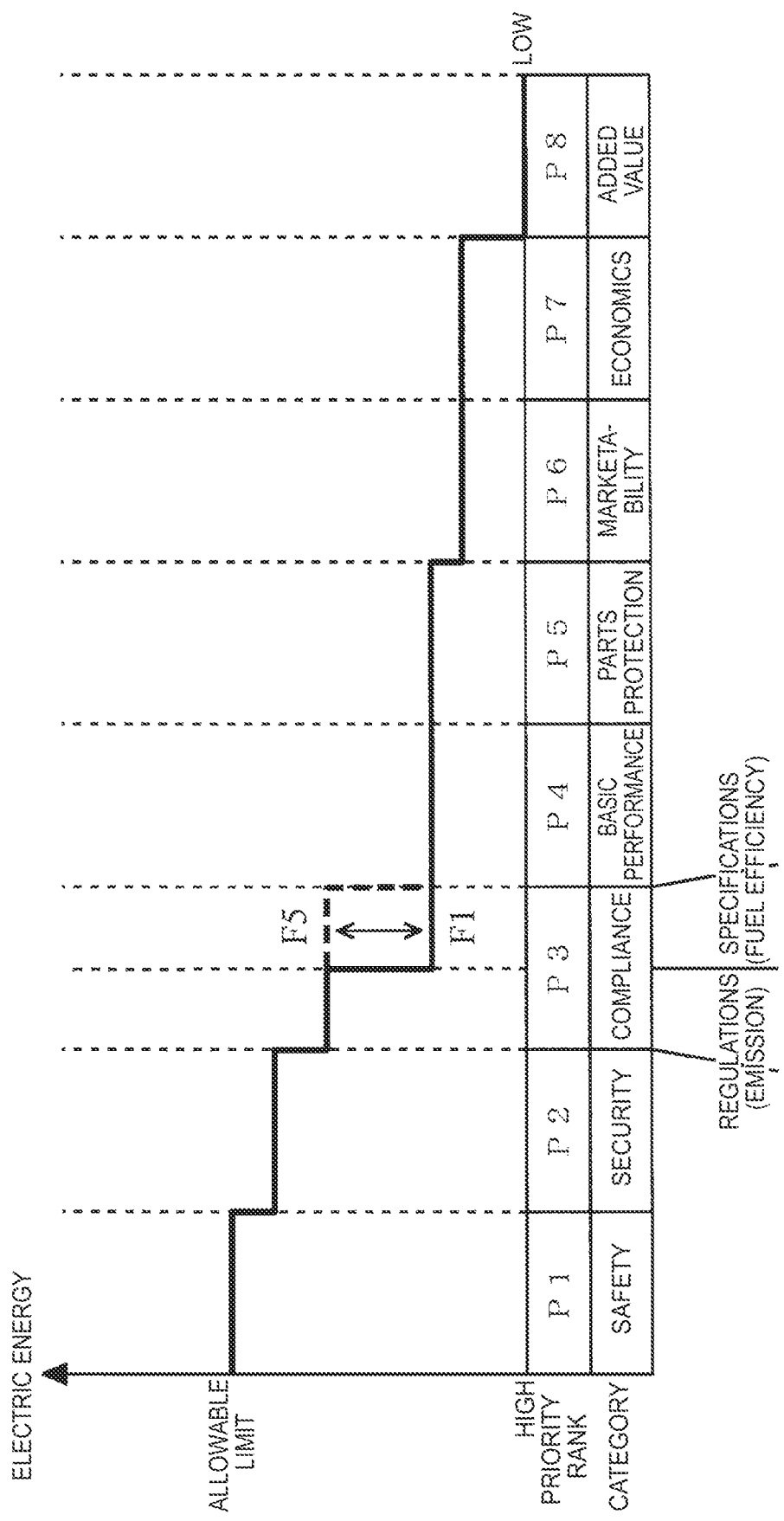
FIG. 13 shows an example in which the allowable limits are set based on the occurrence frequency ranks.

FIG. 13 shows an example in which the allowable limits regarding the electric energy supply shown in FIG. 5 are set using the occurrence frequency ranks. In the example of FIG. 13, regarding the specifications (fuel efficiency) of the priority rank P3-2, the allowable limit is set low to limit the supply of electric energy in response to the electric energy demand with high frequency (on the occurrence frequency rank F1 side), whereas the allowable limit is set high to allow large electric energy to be supplied in response to the electric energy demand with low frequency (on the occurrence frequency rank F5 side). Thus, by performing control so that more supply of electric energy is allowed (the supply is less limited) in response to an electric energy demand with lower frequency, it is possible to suppress an excessive limitation on the supply of electric energy.

Figure 14:
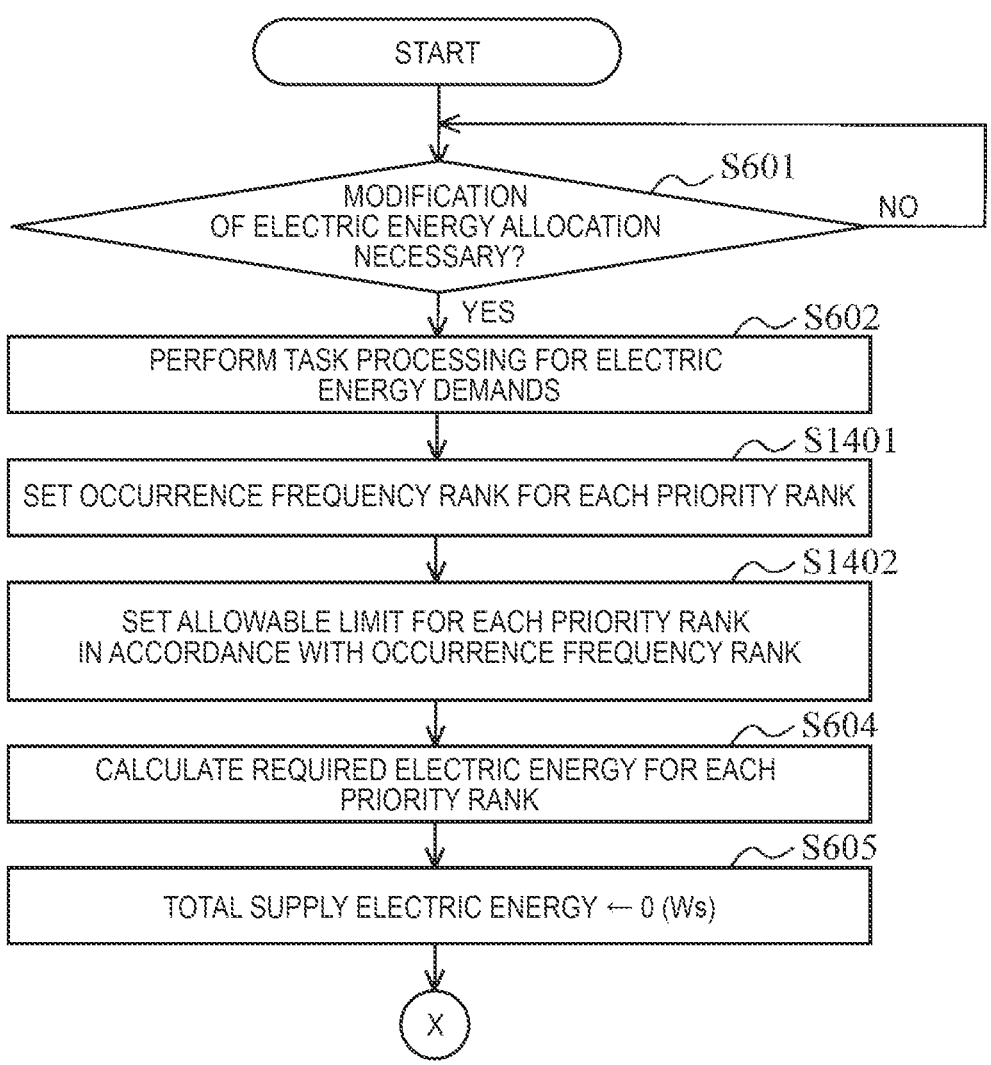
FIG. 14 is a flowchart of the energy (electric energy) allocation control in which the occurrence frequency ranks are used in processing of FIG. 6A.

FIG. 14 is a flowchart showing a case where the occurrence frequency ranks are used in the processing of the electric energy allocation control shown in FIG. 6A. In FIG. 14, steps S1401 and S1402 are executed instead of step S603 of FIG. 6A. In the case where the occurrence frequency ranks are used, when the task processing for the electric energy demand is completed in step S602, the process proceeds to step S1401.

Step S1401: the controller 50 sets an occurrence frequency rank for each priority rank (for each sub-category, if there are sub-categories). At this time, when a plurality of tasks of different occurrence frequency ranks occur in the same priority rank, the lowest one is set as the occurrence frequency rank of that priority rank. When the occurrence frequency ranks are set, the process proceeds to step S1402.

Step S1402: the controller 50 sets, for each priority rank (for each sub-category, if there are sub-categories), the allowable limit that is the upper limit value of electric energy that can be supplied in response to the electric energy demand, in accordance with the occurrence frequency rank set in step S1401. When the allowable limit corresponding to the occurrence frequency rank is set for each priority rank, the process proceeds to step S604. Step S604 and the subsequent steps are the same as described above.

Figure 15:
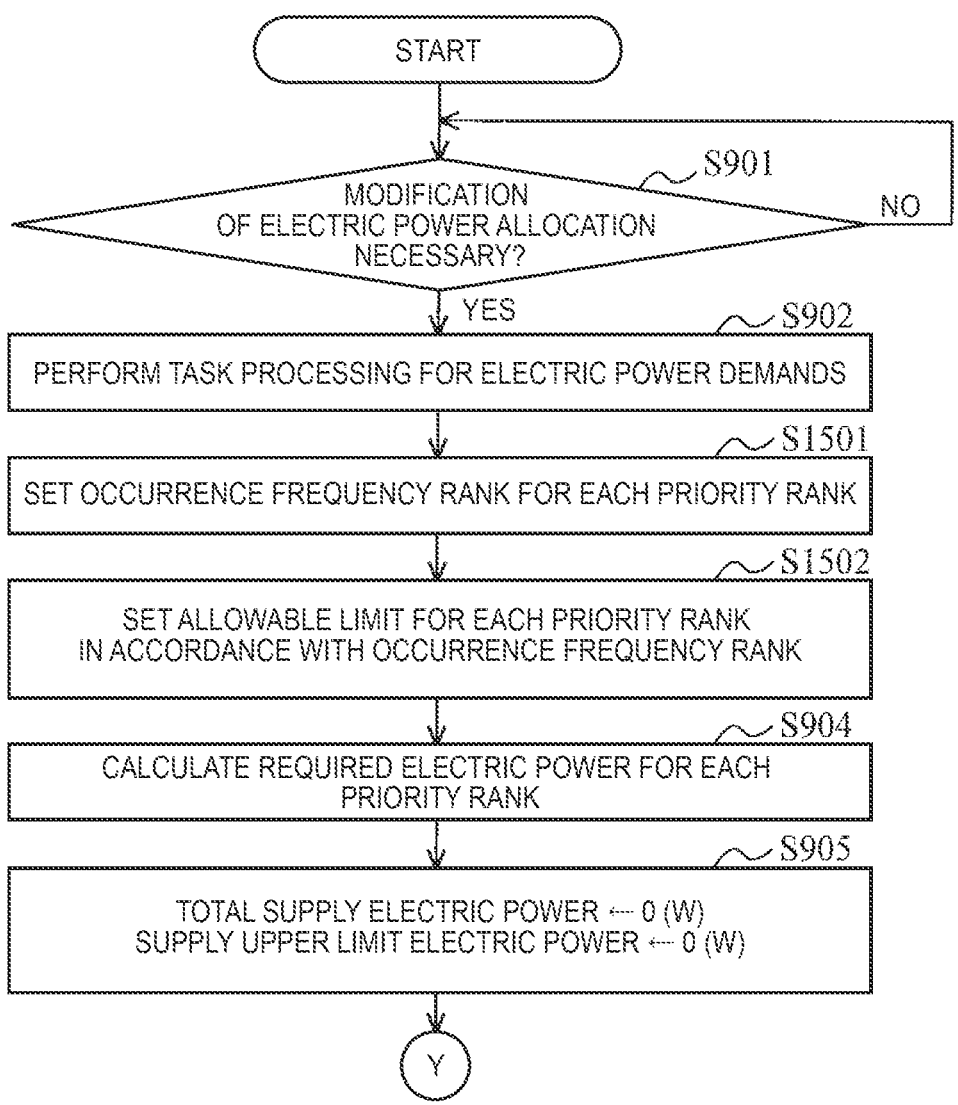
FIG. 15 is a flowchart of the power (electric power) allocation control in which the occurrence frequency ranks are used in processing of FIG. 9A.

FIG. 15 is a flowchart showing a case where the occurrence frequency ranks are used in the processing of the electric power allocation control shown in FIG. 9A. In FIG. 15, steps S1501 and S1502 are executed instead of step S903 of FIG. 9A. In the case where the occurrence frequency ranks are used, when the task processing for the electric power demand is completed in step S902, the process proceeds to step S1501.

Step S1501: the controller 50 sets an occurrence frequency rank for each priority rank (for each sub-category, if there are sub-categories). At this time, when a plurality of tasks of different occurrence frequency ranks occur in the same priority rank, the lowest one is set as the occurrence frequency rank of that priority rank. When the occurrence frequency ranks are set, the process proceeds to step S1502.

Step S1502: the controller 50 sets, for each priority rank (for each sub-category, if there are sub-categories), the allowable limit that is the upper limit value of electric power that can be supplied in response to the electric power demand, in accordance with the occurrence frequency rank set in step S1501. When the allowable limit corresponding to the occurrence frequency rank is set for each priority rank, the process proceeds to step S904. Step S904 and the subsequent steps are the same as described above.

In the above application example, the case where the occurrence frequency ranks are fixedly defined in advance based on the demands for electric power etc. has been described. However, the controller 50 or the like may store the number of times that a demand for electric power etc. has been generated, so as to dynamically change the allowable limit in accordance with the change in the number of occurrences of the demand.

In the above application example, the demand for consuming electric power etc. has been described. However, the demand for accumulating electric power etc. can be similarly considered. For example, for the storage demand of a high occurrence frequency rank, a supply requirement (storage requirement) with a small increase ΔSOC from the control center SOC of the high-voltage battery 20 may be set so that regenerative electric power can be taken in efficiently each time the storage demand occurs thereafter. For the storage demand of a low occurrence frequency rank, a supply requirement (storage requirement) with a large increase ΔSOC from the control center SOC of the high-voltage battery 20 may be set so that as much regenerative power as possible can be taken in at that time.

Other Application Examples

When the total electric power or the total electric energy required from the devices 10 exceeds the allowable limit of the high-voltage battery 20 and the demand for electric power etc. cannot be satisfied, the controller 50 may require any of the devices 10 limitation of the demand for electric power or electric energy (limitation of operation) or stop of the demand for electric power etc. (stop of operation). Further, when the controller 50 requires the device 10 limitation or stop of the demand for electric power etc. but the shortage of electric power etc. is not resolved, the controller 50 may temporarily supply electric power etc. as a backup from the low-voltage battery 30 to the device 10.

When the provision of electric energy from the high-voltage battery 20 continues for a long period of time and the amount of electricity stored in the high-voltage battery 20 decreases to a predetermined value so that the supply of electric energy is disabled, the controller 50 may forcibly disconnect the SMR 21. Thereby, the high-voltage battery 20 can be protected.

OPERATIONS/EFFECTS

As described above, in the supply-demand control device according to the embodiment of the disclosure, the priority ranks indicating the priority order for supplying power (electric power) or energy (electric energy) from the supply/storage source (high-voltage battery) are defined in advance, and various demands for power (electric power) or energy (electric energy), which can occur in the vehicle, are classified into the priority ranks. For each priority rank, the allowable limit is set that indicates the upper limit value of power (electric power) or energy (electric energy) that is allowed to be supplied from the supply/storage source (high-voltage battery) within the range of the values set for the higher priority ranks (trimming). The power (electric power) or energy (electric energy) that is supplied from the supply/storage source (high-voltage battery) is allocated to the demands of the various priority ranks in order of the priority rank based on the allowable limits.

Thus, the supply of power (electric power) or energy (electric energy) is allocated to the demands for power (electric power) or energy (electric energy) in order of the priority rank with the restriction that the trimmed allowable limit for each priority rank is not exceeded. Therefore, the maximum power (electric power) or energy (electric energy) that can be supplied in response to the demand of a relatively low priority rank is limited to be equal to or less than the maximum power (electric power) or energy (electric energy) that can be supplied in response to the demand of a relatively high priority rank. Thus, for example, it is possible to suppress a situation that the supply of power (electric power) or energy (electric energy) in response to the demand of power (electric power) or energy (electric energy) of a low priority rank is performed with higher priority, compared with the supply of power (electric power) or energy (electric energy) in response to the demand for power (electric power) or energy (electric energy) of a high priority rank. Thus, the supply and demand of power (electric power) or energy (electric energy) can be appropriately controlled based on the priority.

In addition, in the supply-demand control device according to the embodiment, each time a new demand for power (electric power) or energy (electric energy) occurs, power (electric power) or energy (electric energy) is allocated to the demands of the various priority ranks in order from the demand of the higher priority rank, with the respective allowable limits of the priority ranks being the upper limits. Thus, the allocation of power (electric power) or energy (electric energy) to the demands is controlled.

As described above, the control is performed so that the power (electric power) or energy (electric energy) that is supplied from the supply/storage source (high-voltage battery) is allocated in order from the demand of the higher priority rank. Therefore, even if multiple demands occur at the same time, it is possible to satisfy the demands of the relatively low priority ranks while preferentially satisfying the demands of the relatively high priority ranks. Thus, the supply and demand of power (electric power) or energy (electric energy) can be appropriately controlled based on the priority.

Regarding the priority ranks, by assigning a high priority rank to the category of vehicle safety, the supply of power (electric energy) or energy (electric energy) for implementing functions, performances, etc. necessary for the safety, which is required of the vehicle, can be performed with higher priority.

In addition, by further defining multiple occurrence frequency ranks indicating the frequency of occurrence of the demand for power (electric power) or energy (electric energy), it is possible to change the allowable limit for each of the priority ranks in accordance with the occurrence frequency rank. As a result, for example, the allowable limit can be set to a larger value for a lower frequency rank with a lower frequency of occurrence of the demand for power (electric power) or energy (electric energy). Thus, it is possible to suppress an excessive supply restriction for a specific demand.

Further, both the allowable limits for the demands for power (electric power) and the allowable limits for the demands for energy (electric energy) can be determined. For example, for the demand that requires low power (low electric power) for a long time, the supply exceeding the limit can be restricted based on the allowable limit for the energy (electric energy) demand. Also, for the demand that requires, for a short time, low energy (electric energy) but a high voltage exceeding the supply capacity of the supply/storage source (high-voltage battery), the supply exceeding the limit can be restricted based on the allowable limit for the power (electric power) demand. In the allocation control in this case, for the demand for which the supply is restricted based on either the allowable limit for power (electric power) or the allowable limit for energy (electric energy), it is conceivable to discard that demand, for example, to modify the allocation of power (electric power) or energy (electric energy) to the other demands.

Note that the supply-demand control device that controls supply and demand of electric power or electric energy described in the above embodiment is applicable to industrial products, besides vehicles with high-voltage batteries, on which a supply/storage source configured to input and output electric power or electric energy is mounted. The supply-demand control device is also applicable to controlling supply and demand of a heat flow (J/s) that is power in the heat field or an amount of heat (J) that is energy in the heat field. The heat flow or the amount of heat can be controlled at the same level as electric power or electric energy using a predetermined conversion device. Furthermore, kinetic energy, potential energy, or the like can be used as an energy supply source.

The embodiment of the disclosure has been described above. The disclosure can be regarded as a supply-demand control device, a system including the supply-demand control device, a method for allocating power or energy for operation of the supply-demand control device, a program for allocating power or energy, a computer-readable non-transitory recording medium storing the program, or an industrial product on which the supply-demand control device is mounted.

The supply-demand control device according to the disclosure can be used for industrial products such as vehicles on which a battery serving as a supply/storage source of power or energy is mounted.

What is claimed is:

1. A supply-demand control device that is mounted on an industrial product and that controls supply and demand of power or energy in the industrial product, the supply-demand control device comprising a controller, the controller being configured to:
   set, for each of a plurality of priority ranks defined in advance to classify various possible demands from the industrial product for the power or the energy, an allowable limit within a range of a value set for a higher priority rank than the each of the priority ranks, the allowable limit indicating an upper limit of the power or the energy that is allowed to be supplied in response to a demand of the each of the priority ranks while the power or the energy that is supplied in response to a demand of the higher priority rank is secured;
   detect the demand for the power or the energy, which occurs in the industrial product; and
   allocate, in order of the priority rank, the power or the energy that is supplied from a predetermined supply source in response to the detected demand for the power or the energy, such that the supplied power or the supplied energy is equal to or lower than the upper limit indicated by the allowable limit set for the each of the priority ranks,
   wherein the controller further defines a plurality of occurrence frequency ranks each indicating a frequency of occurrence of the demand for the power or the energy, and the controller is configured to change the allowable limit for the each of the priority ranks in accordance with the occurrence frequency ranks.

2. The supply-demand control device according to claim 1, wherein the controller is configured to allocate, each time the demand for the power or the energy is detected and within a range of possibility, the power or the energy required by the demand for the power or the energy and equal to or lower than the upper limit indicated by the allowable limit for the each of the priority ranks, in order from the demand for the power or the energy of the higher priority rank, and the controller is configured to allocate the power or the energy that is supplied from the supply source in response to the demand for the power or the energy.

3. The supply-demand control device according to claim 1, wherein the controller is configured to set the allowable limit larger for an occurrence frequency rank, out of the occurrence frequency ranks, having a lower frequency of occurrence of the demand for the power or the energy than the other occurrence frequency ranks.

4. The supply-demand control device according to claim 1, wherein the power is electric power and the energy is electric energy.

5. A method for controlling supply and demand of power or energy in an industrial product, the method comprising:
   setting, for each of a plurality of priority ranks defined in advance to classify various possible demands from the industrial product for the power or the energy, an allowable limit within a range of a value set for a higher priority rank than the each of the priority ranks, the allowable limit indicating an upper limit of the power or the energy that is allowed to be supplied in response to a demand of the each of the priority ranks while the power or the energy that is supplied in response to a demand of the higher priority rank is secured;
   detecting the demand for the power or the energy, which occurs in the industrial product; and
   allocating, in order of the priority rank, the power or the energy that is supplied from a predetermined supply source in response to the detected demand for the power or the energy, such that the supplied power or the supplied energy is equal to or lower than the upper limit indicated by the allowable limit set for the each of the priority ranks,
   wherein allocating further defines a plurality of occurrence frequency ranks each indicating a frequency of occurrence of the demand for the power or the energy, to change the allowable limit for the each of the priority ranks in accordance with the occurrence frequency ranks.

6. The method according to claim 5, wherein allocating allocates, each time the demand for the power or the energy is detected and within a range of possibility, the power or the energy required by the demand for the power or the energy and equal to or lower than the upper limit indicated by the allowable limit for the each of the priority ranks, in order from the demand for the power or the energy of the higher priority rank, and further allocates the power or the energy that is supplied from the supply source in response to the demand for the power or the energy.

7. The method according to claim 5, wherein allocating sets the allowable limit larger for an occurrence frequency rank, out of the occurrence frequency ranks, having a lower frequency of occurrence of the demand for the power or the energy than the other occurrence frequency ranks.

8. The method according to claim 5, wherein the power is electric power and the energy is electric energy.

9. A non-transitory computer-readable storage medium storing instructions which, when executed by at least one processor, cause the at least one processor to perform:
   setting, for each of a plurality of priority ranks defined in advance to classify various possible demands from an industrial product for power or energy, an allowable limit within a range of a value set for a higher priority rank than the each of the priority ranks, the allowable limit indicating an upper limit of the power or the energy that is allowed to be supplied in response to a demand of the each of the priority ranks while the power or the energy that is supplied in response to a demand of the higher priority rank is secured;
   detecting the demand for the power or the energy, which occurs in the industrial product; and
   allocating, in order of the priority rank, the power or the energy that is supplied from a predetermined supply source in response to the detected demand for the power or the energy, such that the supplied power or the supplied energy is equal to or lower than the upper limit indicated by the allowable limit set for the each of the priority ranks, wherein allocating further defines a plurality of occurrence frequency ranks each indicating a frequency of occurrence of the demand for the power or the energy, to change the allowable limit for the each of the priority ranks in accordance with the occurrence frequency ranks.

10. The non-transitory computer-readable storage medium according to claim 9, wherein allocating allocates, each time the demand for the power or the energy is detected and within a range of possibility, the power or the energy required by the demand for the power or the energy and equal to or lower than the upper limit indicated by the allowable limit for the each of the priority ranks, in order from the demand for the power or the energy of the higher priority rank, and further allocates the power or the energy that is supplied from the supply source in response to the demand for the power or the energy.

11. The non-transitory computer-readable storage medium according to claim 9, wherein allocating sets the allowable limit larger for an occurrence frequency rank, out of the occurrence frequency ranks, having a lower frequency of occurrence of the demand for the power or the energy than the other occurrence frequency ranks.

12. The non-transitory computer-readable storage medium according to claim 9, wherein the power is electric power and the energy is electric energy.

\* \* \* \* \*